US 11,135,040 B2

(12) United States Patent
Coopersmith

(10) Patent No.: US 11,135,040 B2
(45) Date of Patent: Oct. 5, 2021

(54) DENTAL DEVICE

(71) Applicant: Allan Coopersmith, Montreal (CA)

(72) Inventor: Allan Coopersmith, Montreal (CA)

(*) Notice: Subject to any disclaimer, the term of this patent is extended or adjusted under 35 U.S.C. 154(b) by 579 days.

(21) Appl. No.: 14/431,620

(22) PCT Filed: Oct. 2, 2013

(86) PCT No.: PCT/IB2013/059075
§ 371 (c)(1),
(2) Date: Mar. 26, 2015

(87) PCT Pub. No.: WO2014/054011
PCT Pub. Date: Apr. 10, 2014

(65) Prior Publication Data
US 2015/0238294 A1 Aug. 27, 2015

Related U.S. Application Data

(60) Provisional application No. 61/708,786, filed on Oct. 2, 2012.

(51) Int. Cl.
*A61C 15/00* (2006.01)
*A61C 15/02* (2006.01)
(Continued)

(52) U.S. Cl.
CPC .......... *A61C 15/02* (2013.01); *A46B 11/0041* (2013.01); *A61C 19/063* (2013.01); *A46B 2200/108* (2013.01); *A61C 17/22* (2013.01)

(58) Field of Classification Search
CPC ....... A61C 15/02; A61C 15/00; A61C 19/063; A61C 17/22; A61C 5/50; A61C 17/16; A46B 11/0041; A46B 2200/108
See application file for complete search history.

(56) References Cited

U.S. PATENT DOCUMENTS 1,969,808 A * 8/1934 Lentulo .................... A61C 5/50
433/164
2,603,921 A 7/1952 Peterson
(Continued)

FOREIGN PATENT DOCUMENTS

CA 2855256 * 11/2011
CN 1464777 A 9/2005
(Continued)

OTHER PUBLICATIONS

International Search Report from PCT/IB2013/059075; dated Feb. 7, 2014; Luc Gollain.
(Continued)

Primary Examiner — Rachel R Steitz
(74) Attorney, Agent, or Firm — Fasken Martineau DuMoulin S.E.N.C.R.L., s.r.l.

(57) ABSTRACT

A dental device comprising: a handle and; a stem. The stem having a tip with an end. The tip has a first groove winding therearound extending from a first distal point proximate the end towards the handle at least one complete turn around the tip to a first-groove termination point. The stem has a first flange projecting outward therefrom and winding therearound. The first flange extends away from the handle from a first proximal point towards the end of the tip to a first-flange termination point. At least a portion of the stem having the first groove and at least a portion of the first flange is suitable for insertion into an area between two teeth, whereby the area between the teeth may be cleaned by the at least a portion of the stem inserted between the teeth.

25 Claims, 19 Drawing Sheets

(51) Int. Cl.
*A46B 11/00* (2006.01)
*A61C 19/06* (2006.01)
*A61C 17/22* (2006.01)

(56) References Cited

U.S. PATENT DOCUMENTS

| | | | |
|---|---|---|---|
| 4,032,803 A | 6/1977 | Durr et al. | |
| 4,219,619 A | 8/1980 | Zarow | |
| 4,274,771 A | 6/1981 | Nishimura | |
| 4,280,518 A | 7/1981 | Gambaro | |
| 4,462,136 A | 7/1984 | Nakao et al. | |
| 4,514,174 A | 4/1985 | Dougherty et al. | |
| 4,608,021 A | 8/1986 | Barrett | |
| 4,679,274 A | 7/1987 | Friedman | |
| 4,712,266 A | 12/1987 | Yamaki | |
| 4,733,425 A | 3/1988 | Hartel et al. | |
| 4,828,420 A | 5/1989 | Otsuka et al. | |
| 4,832,061 A | 5/1989 | Hwang | |
| 4,850,875 A | 7/1989 | Takatsu | |
| 4,911,187 A | 3/1990 | Castillo | |
| 4,922,936 A | 5/1990 | Buzzi et al. | |
| 5,123,841 A | 6/1992 | Millner | |
| 5,125,834 A | 6/1992 | Swan | |
| 5,133,661 A | 7/1992 | Euvrard | |
| 5,219,284 A * | 6/1993 | Velvart | A61C 5/42 433/102 |
| 5,283,924 A | 2/1994 | Kaminski et al. | |
| 5,377,377 A | 1/1995 | Bredall et al. | |
| 5,491,863 A | 2/1996 | Dunn | |
| 5,609,170 A | 3/1997 | Roth | |
| 5,639,238 A | 6/1997 | Fishburne et al. | |
| 5,647,851 A | 7/1997 | Pokras | |
| 5,699,578 A | 12/1997 | Dumler et al. | |
| 5,704,388 A | 1/1998 | Freeman | |
| 5,735,689 A | 4/1998 | McSpadden | |
| 5,755,572 A | 5/1998 | Bab et al. | |
| 5,775,346 A | 7/1998 | Szyszkowski | |
| 5,839,895 A | 11/1998 | Fishburne et al. | |
| 5,842,862 A | 12/1998 | Nissan | |
| 5,851,116 A | 12/1998 | Margolis | |
| 6,142,778 A | 11/2000 | Summer | |
| 6,171,108 B1 | 1/2001 | Roane | |
| 6,257,889 B1 | 7/2001 | Boston | |
| D454,003 S * | 3/2002 | Saxon | D4/102 |
| 6,418,940 B1 | 7/2002 | Tcherny et al. | |
| 6,468,080 B1 * | 10/2002 | Fischer | A61C 5/88 433/149 |
| 6,545,390 B1 | 4/2003 | Hahn et al. | |
| 6,575,748 B1 | 6/2003 | Filhol | |
| 6,579,082 B2 | 6/2003 | Castellari | |
| 6,602,229 B2 | 8/2003 | Coss | |
| 6,634,051 B1 | 10/2003 | Dragan et al. | |
| 6,638,067 B2 | 10/2003 | Fischer et al. | |
| 6,648,561 B2 | 11/2003 | Kraemer | |
| 6,702,579 B1 | 3/2004 | Hoppe et al. | |
| 6,860,737 B2 | 3/2005 | Ulso | |
| 6,932,604 B2 | 8/2005 | Han et al. | |
| 6,981,869 B2 * | 1/2006 | Ruddle | A46B 13/006 433/102 |
| 7,018,205 B2 | 3/2006 | Abel | |
| 7,025,986 B2 | 4/2006 | Brown et al. | |
| 7,033,101 B2 | 4/2006 | Han | |
| D571,043 S * | 6/2008 | Crossman | D28/65 |
| 7,806,125 B2 * | 10/2010 | Coopersmith | A61C 15/02 132/322 |
| 8,622,643 B2 * | 1/2014 | Fritze | A46B 9/005 401/126 |
| 2003/0176531 A1 | 9/2003 | Kassab | |
| 2003/0224320 A1 | 12/2003 | Kandelman | |
| 2004/0121413 A1 | 6/2004 | Aebersold et al. | |
| 2005/0037316 A1 | 2/2005 | Sholder | |
| 2006/0174910 A1 | 8/2006 | Coopermith | |
| 2009/0071499 A1 * | 3/2009 | Wyatt | A45D 40/265 132/218 |

FOREIGN PATENT DOCUMENTS

| | | |
|---|---|---|
| GB | 439016 A | 11/1935 |
| JP | 2005058259 A | 3/2005 |
| JP | 2005169046 A | 6/2005 |

OTHER PUBLICATIONS

English abstract of CN 1464777; retreived form Espacenet on Dec. 28, 2015.

Supplementary European Search Report from EP 13844522, dated Jun. 1, 2016, Oelschlager, Holger.

English abstract of 2005058259 retrieved from Espacenet on Jun. 29, 2016.

English abstract of 2005169046 retrieved from Espacenet on Jun. 29, 2016.

* cited by examiner

DENTAL DEVICE

CROSS-REFERENCE

The present application claims priority to U.S. Provisional Patent Application Ser. No. 61/708,786, filed Oct. 2, 2012, entitled "Dental Device". That application is incorporated herein by reference herein in its entirety.

FIELD

The present technology relates to dental devices suitable for inter-dental cleaning use and delivery of dentally-active materials.

BACKGROUND

The area between the teeth (which is referred to as the inter-dental area) is the area which is most prone to plaque accumulation, periodontal breakdown and dental caries because it is the area of the mouth which is the most difficult to clean.

Specifically, the inter-dental area refers to the inter-proximal area, which is the area between adjacent teeth which consists of the roots of the teeth which are covered in cementum which overlies the dentin surface and may also contain enamel which covers the dentin from the crest of the gingiva to the contact area—the area where to proximal teeth contact one another (i.e., dentin, enamel, cementum, gingiva, sub-gingival sulcus, periodontal pocket, etc.). Often the cementum is eroded or abraded leaving the underlying soft vulnerable dentin surface exposed leading to hypersensitivity or caries. This is the area also most vulnerable to plaque accumulation leading to periodontal breakdown.

Most devices designed to clean this inter-dental area require manual dexterity, are difficult to use, take too much time, are painful, inefficient, tear or break easily, and/or are expensive, and therefore contribute to poor compliance by the patient. Dental floss is difficult to use and does not adequately clean the inter-dental areas especially when some periodontal breakdown has already occurred. Currently most inter-dental devices are brushes which are commonly made from nylon bristles which have been inserted into a twisted wire stem. These brushes are fragile and break frequently. The wire can scratch and irritate the fragile root surface as well as dental restorations and implants. They are often too wide to fit comfortably between the teeth. Other inter-dental cleaners which are shaped like wedges can clean only by a push/pull technique and often leave plaque and debris behind.

These devices are also limited as they are not able to adequately deliver dentally-active materials such as medications, antiseptics, fluorides, re-calcification products, varnishes, whitening products, polishing products etc. to the area between the teeth. Although some existing products may be used to carry or deliver said substances, most will remove these substances from between the teeth as the device is withdrawn. Further, the existing products are mostly used manually and are not designed to have the additional benefit of easily and effectively being used in a motorized apparatus, sonic or ultrasonic device, or dental hand piece.

One device previously proposed by creator of the present technology attempting to ameliorate in this area was the device described in U.S. Pat. No. 7,806,125, entitled "Inter Dental Tooth Cleaner and Delivery Device", issued Oct. 5, 2010, incorporated by reference herein in its entirety. While that device is certainly adequate for its intended purpose, improvements thereto are nonetheless possible.

SUMMARY

It is thus an object of the present technology to provide improvements to devices intended for cleaning the inter-dental area.

Hence, in one aspect, embodiments of the present technology provide a dental device comprising: a handle; a stem, the stem having a tip with an end, the tip having a first groove winding therearound extending from a first distal point proximate the end towards the handle at least one complete turn around the tip to a first-groove termination point (e.g. in a similar manner to the flute of a drill bit); the stem having a first flange projecting outward therefrom and winding therearound (e.g. in a similar manner to the thread of a screw), the first flange extending away from the handle from a first proximal point towards the end of the tip to a first-flange termination point; at least a portion of the stem having the first groove and at least a portion of the first flange being suitable for insertion into an area between two teeth; whereby the area between the teeth may be cleaned by the at least a portion of the stem inserted between the teeth.

The stem of the device is sized and dimensioned so that at least the tip (and likely more of the stem) can be inserted into an inter-dental area of two adjacent teeth for cleaning purposes. Depending on the intended use of the device, different embodiments will have stems (including tips) of different shapes and sizes. Depending on the size and shape of the stem, the configuration of the groove(s) and flange(s) present on the stem, and on the size and shape of the inter-dental area into which the stem is being inserted, at least one of the groove(s) and flange(s) will be present in the interdental area and will contact the teeth along with the exterior (outer) surface of the stem. (In most embodiments the tip is solid and is small/narrow enough to fit into the smallest of inter-dental areas.) The area of contact of the teeth with the stem will be cleaned in part by the mechanical action of the contact. Thus the stem may be repeatedly removed and re-inserted into the inter-dental area in one aspect of the cleaning. (The stem is inserted between into the inter-dental area and then pushed in between the teeth until resistance is felt.) Foreign materials (food debris, plaque, etc.) in the inter-dental area may be pushed out the lingual side of the teeth as the stem is inserted into the inter-dental area or such materials may be trapped within the groove(s) and/or valley(s) created by successive turns of the flange(s) of the device and may be removed from the inter-dental area when the stem is removed.

The stem may also be rotated (be it manually or with mechanized assistance) once inserted. In this respect, the groove(s) and flange(s) are structured and arranged on the stem (in particular by being wound therearound) to assist with cleaning inter-dental area in an additional manner. When the stem is rotated in one direction, depending on the handedness of the winding of the groove(s) and/or flange(s) present thereon and on the size and shape of the stem/tip, this rotation may assist in causing the stem to be drawn deeper into the inter-dental area as the groove(s) may act to grip the teeth (in a screw-like manner). This rotation may also assist in extracting foreign materials from the inter-dental area in a similar fashion to the way that the flute of a drill bit assists in extracting the material through which the bit is drilling (e.g. swarf). (For right-handed windings the stem would be rotated clockwise to accomplish this function. For left-handed windings the stem would be rotated counter-clockwise to accomplish this function.) The foreign materials may travel up the stem (towards the handle) within the groove(s) and/or within the valley(s) created between successive turns of the flange(s) and out of the inter-dental area for removal. In some circumstances, this may be more efficient at removing foreign materials than simply removing and re-inserting the stem in the inter-dental area. Alternatively, when the stem is rotated in the opposite direction, this rotation may also assist in extracting foreign materials from the inter-dental area, by entrapping them within the groove(s) and/or within the valley(s) created by successive turns of the flange(s) and transporting them through the inter-dental area to the lingual side of the teeth. (For right-handed windings the stem would be rotated counter-clockwise to accomplish this function. For left-handed windings the stem would be rotated clockwise to accomplish this function.)

Rotation in either direction may also assist in cleaning in the inter-dental area via friction while contacting the teeth. Rotation of the stem is not limited solely to when the stem is fully inserted between the teeth. The stem may also be rotated while the stem is being inserted and/or withdrawn from between the teeth, to further assist in cleaning.

In some embodiments the flanges and the grooves have a helical or spiral or modified spiral arrangement and structure. The longitudinal, horizontal and oblique structure of the spiral of the flanges and grooves provides for cleaning and delivery of substances to the inter dental area, and particularly when the device is rotated, vibrated, and irrigated or any and all combinations thereof. This structure also facilitates easier withdrawal from the mold during the manufacturing process.

In some embodiments, the device may be easily attachable to other devices. The device may function manually as it is held and rotated or used in an in-out manner by finger action of the handle or handle extension (handle may attach to the device cover), or a mechanical apparatus. The stem may be inserted into or onto a sonic or ultrasonic device and vibrated. The stem consists of flanges and grooves arranged in horizontal, oblique and vertical arrangement, (which also allows for easy and unhindered ejection from a mold), allowing for cleaning as well as dispersal of substances and medicaments when vibrated. The vibrations are transmitted to the flanges and grooves of the device so that when said device is inserted into the inter dental space, the increased movement and friction provides for an improved cleaning of this space, even when keeping the device stationary, preferably when the device is rotated or inserted and withdrawn. Medicaments may also be more effectively transmitted to the interdental space using vibration when attached to a sonic or ultrasonic apparatus much in the same way as a dog disperses water from his fur as he shakes back and forth. Easy attachment of the device to sonic and ultrasonic apparatuses will transmit vibration to improve the delivery and depth of penetration within the sulcus and specifically inter dentally, of medicaments to the teeth, gingiva and periodontal tissues. The device can also be easily attached to a water irrigating apparatus, pumping substances and medicaments into or onto said device as the device cleans and medicates. It may be easily attached to apparatuses which may produce rotation, vibration, as well as irrigation or any and all combinations thereof. The device may be easily attachable to a common manual toothbrush, preferably the handle, (allowing for the convenience of brushing and inter dental cleaning with the same device). When the device is attached to the dorsal or ventral aspect of the handle, the device preferably would be used in an in-out manner. When the device is attached to the end of the manual toothbrush, the device can be easily made to rotate as the toothbrush is rotated, or can be used in an in-out manner as well.

The groove(s)/flange(s) of the stem may also serve a second purpose, to assist in delivering dentally-active materials to the inter-dental area. For example, were the stem to be dipped into a fluidic dentally-active material, such material might be entrapped within the groove(s) and/or valley(s) between successive flange(s) of the stem (in addition to coating the exterior surface of the stem). Were the stem to be inserted into the inter-dental area, such material would likely become dislodged and/or rub off the stem at the contact area and be delivered to the inter-dental area. Further, and again depending on the handedness of the winding of the groove(s) and/or flange(s), rotating the stem in the opposite direction (i.e. counter-clockwise for right-handed windings, clockwise for left-handed windings), will reverse the direction of travel of materials within the groove(s) and/or valley(s) created between successive turns of the flange(s) as we described above. Thus, when the stem is inserted into the inter-dental area and rotated in the opposition direction from that described above with respect to the "drill-like" foreign material removal, dentally-active materials within the groove(s) and/or within the valley(s) created between successive turns of the flange(s) may travel to the inter-dental area and be delivered there by this action as well. A significant amount of delivered material remains in the inter-dental area after the device is removed. Thus, the inter-dental area may be simultaneously cleaned (by friction) and, for example, be medicated (e.g. fluorinated via the delivery of fluorinated materials) in this manner as well. (For the purposes of the present specification, dentally-active materials may include, but are not limited to, medicaments, antiseptics, antibiotics, abrasives, antibacterials, whiteners, de-sensitizers, de-mineralizers, re-mineralizers, varnishes, fluorides, dental pastes, dental slurries, dental gels and dental solutions (e.g. re-mineralization pastes.))

The stem may be manufactured from any suitable dentally-compatible material. Examples of such materials include plastics such as regular or high-density polyethylene, polypropylene, polycarbonates, etc.; wood; rubber; latex; silicone; or related or derived materials. The stem need not be manufactured from a single or uniform material. Any suitable combination of suitable materials is possible. The stem may be manufactured by and suitable means appropriate to the material(s) of which it is being made. Between different embodiments, mechanical properties of the stem such as rigidity, flexibility, compressibility, elasticity, etc. will vary. The only requirement with respect to any such mechanical properties is that the stem must be suitable for its intended purposes as described herein.

In some embodiments of the present technology, the first-groove termination point and the first-flange termination point are the same point. Thus the first groove is continuous with the first flange. (Similarly in embodiments where there is more than one groove and/or flange, other grooves may share termination points with other flanges.) Without wishing to be bound by any particular theory, in some embodiments, this configuration appears to assist in the transport of materials within/by the groove(s) and flange(s), and particularly in the transfer of materials from a groove to a flange and vice-versus.

In some embodiments of the present technology, the first-groove termination point and the first-flange termination point are radially offset from one another. Thus, the first-groove termination point and the first-flange termination point appear to have been "twisted" around the stem of the device from one another. In embodiments where there is more than one groove and/or flange, the termination points of other grooves may be radially offset from the termination points with other flanges in a similar manner.

In some embodiments of the present technology, the first-groove termination point and the first-flange termination point are axially offset from another. In some such embodiments, the first-groove termination point is closer to the end of the tip than is the first-flange termination point. In such embodiments, the two points are longitudinally spaced from one another on the stem; thus, there is a longitudinal gap between them. In other such embodiments, the first-groove termination point is further from the end of the tip than is the first-flange termination point; thus, the first groove and the first flange are "interwound" for a portion of each. In some such embodiments, the first groove extends within a part of the valley formed between successive turns of the first flange. In some embodiments, this may assist in the transport of materials within/by the groove and flange, and particularly in the transfer of materials from a groove to a valley created between successive turns of a flange and vice-versus. In embodiments where there is more than one groove and/or flange, the termination points of other grooves may be axially offset from the termination points with other flanges in a similar manner.

In should be understood that in some embodiments, the first-groove termination point and the first-flange termination point may be both radially and axially offset from one another. In embodiments where there is more than one groove and/or flange, the termination points of other grooves may be radially offset from the termination points with other flanges in a similar manner.

In some embodiments, the first groove is continuous with a valley formed between successive turns of the first flange. In this respect, the first groove terminates at the same point on the stem as the valley created between successive turns of the first flange. Again, depending on the embodiment and the materials involved, this may assist in the transport of materials within/by the groove and flange, and particularly in the transfer of materials from the groove to the flange and vice-versus. In embodiments where there is more than one groove and/or flange, other grooves may be continuous with other valleys formed between successive turns of other flanges.

In some embodiments, the first groove and the first flange are of a same handedness. In some such embodiments, the first groove and the first flange are each left-handed. In some such embodiments, the first groove and the first flange are each right-handed. The particular handedness in any particular embodiment might vary depending on, for example, whether the device were intended to be used by right-handed people or by left-handed people. Without wishing to be bound by any particular theory, it is theorized that right-handed people would prefer to use devices with left-handed windings of the groove(s) and flange(s). In embodiments where there is more than one groove and/or flange, each of the grooves and the flanges may be of a same handedness.

However, in some embodiments, the first groove and the first flange are of an opposite handedness. In some such embodiments, the first groove is left-handed and the first flange is right-handed. In some such embodiments, the first groove is right-handed and the first flange is left-handed. Depending on the embodiment, such configurations may be useful for example to allow for the groove(s) to be used to assist in the removal of foreign materials from the inter-dental area and the flange(s) to be used to assist in the delivery of dentally-active materials to the inter-dental area, or vice-versa. In embodiments where there is more than one groove and/or flange, each of the grooves may be of an opposite handedness to each of the flanges.

In some embodiments the first groove is of uniform depth, thickness, and shape. In some embodiments, the first groove is of at least one of a non-uniform depth, a non-uniform thickness, and a non-uniform shape. No particular depth, thickness, or shape of the groove is required. The groove may be of any depth, thickness or shape allowing the groove to serve its intended functions as described herein. In embodiments where there are multiple grooves, the grooves may be of a uniform depth, thickness and shape or of at least one of a non-uniform depth, a non-uniform thick, and a non-uniform shape.

In some embodiments, the first flange is of a uniform thickness. In some embodiments, the first flange is of a variable thickness. No particular flange thickness is required. The flange may be of any thickness allowing the flange to serve its intended functions as described herein. In embodiments where there are multiple flanges, the flanges may be of a uniform thickness and length or of at least one of a non-uniform thickness and/or length.

In some embodiments, the first flange tapers towards the end of the tip. Thus, in some such embodiments, the distance the flange extends away from the stem becomes smaller as the flange progresses towards the end of the tip of the stem. Where such it is the case, it is not required that the flange taper at a uniform rate. The flange may taper either uniformly or non-uniformly. In embodiments where there are multiple flanges, the flanges may taper either uniformly or non-uniformly. In addition, some flanges may taper and others may not.

In some embodiments, the first flange uniformly extends from the stem. Thus, in some such embodiments, the distance the flange extends away from the stem is constant. In embodiments where there are multiple flanges, each of the flanges may uniformly extend from the stem, at least one of the flanges may extend uniformly from the stem, or none of the flanges may extend uniformly from the stem.

In some embodiments, the stem is one of circular, triangular or square in cross-section. In some such embodiments, the stem is entirely one of circular, triangular or square in cross-section. In some such embodiments, the stem is more than one of circular, triangular or square in cross-section.

In some embodiments, at least a portion of the stem tapers towards the end of the tip. In some such embodiments such tapering may be uniform. In some such embodiments, such tapering may be non-uniform.

In some embodiments, the tip is one of circular, triangular or square in cross-section. In some such embodiments, the tip will be of the same cross-section as the remainder of the stem. In some such embodiments, the tip will be of a different cross-section than another part of the stem. In some such embodiments, the tip is more than one of circular, triangular or square in cross-section.

In some embodiments, at least a portion of the tip tapers towards the end of the tip. In some such embodiments, the tapering may be uniform. In some such embodiments, the tapering may be non-uniform.

In some embodiments, the tip is of a uniform cross-section.

In some embodiments, the first groove is helical. In embodiments where there is more than one groove, each of the grooves may be helical. For example, in embodiments where there are two grooves, each of the grooves may be helical forming a double helix. In some embodiments, the first groove (while still winding around the stem) does not form a perfect helix. In embodiments where there is more than one groove, none of the grooves may form perfect helices. In some embodiments, the first groove may be a perfect spiral. In embodiments where there is more than one groove, each of the grooves may be a perfect spiral.

In some embodiments, the first groove has a series of linear portions interconnected by a series of curved portions. In some such embodiments, corresponding linear portions of each turn of the first groove are parallel. In some such embodiments, each turn of the first groove has four distinct linear portions. In embodiments where there are multiple grooves, each of the grooves may have the aforementioned characteristics. Depending on the embodiment and the method of manufacture of the stem, having structures described in the present paragraph may simplify the manufacture of the stem. For example, such structures may make the stem easier and/or simpler to remove from a mold.

In some embodiments, the first flange is helical. In embodiments where there is more than one flange, each of the flanges may be helical. For example, in embodiments where there are two flanges, each of the flanges may be helical forming a double helix. In some embodiments, the first flange (while still winding around the stem) does not form a perfect helix. In embodiments where there is more than one flange, none of the flanges may form perfect helices. In some embodiments, the first flange may be a perfect spiral. In embodiments where there is more than one flange, each of the grooves may be a perfect spiral.

In some embodiments, the first flange has a series of planar portions interconnected by a series of curved portions. In some such embodiments, corresponding planar portions of each turn of the first flange are parallel. In some such embodiments, each turn of the first flange has four distinct planar portions. In embodiments where there are multiple flanges, each of the flanges may have the aforementioned characteristics. Depending on the embodiment and the method of manufacture of the stem, having structures described in the present paragraph may simplify the manufacture of the stem. For example, such structures may make the stem easier and/or simpler to remove from a mold.

In some embodiments the first groove is continuous. Thus, the first groove would have no breaks or discontinuities as the first groove winds around the stem.

In some embodiments, the first groove is discontinuous. Thus, the first groove would have at least one (or even several) break(s) or discontinuity(ies) as the first groove winds around the stem. No particular form or manner of construction of such break(s) or discontinuity(ies) is required. Where there are multiple such breaks or discontinuities they need not be of the same form.

In embodiments where there are multiple grooves, there is no requirement that the continuity/discontinuity be the same between the grooves.

In some embodiments, the first flange is continuous. Thus, the first flange would have no breaks or discontinuities as the first groove winds around the stem.

In some embodiments, the first flange is discontinuous. Thus, the first flange would have at least one (or even several) break(s) or discontinuity(ies) as the first flange winds around the stem. No particular form or manner of construction of such break(s) or discontinuity(ies) is required. Where there are multiple such breaks or discontinuities they need not be of the same form. As non-limiting examples, such break(s) or discontinuity(ies) may take the form of notches, grooves, recesses, indents, etc.

In embodiments where there are multiple flanges, there is no requirement that the continuity/discontinuity be the same between the flanges.

In some embodiments, the dental device further comprises at least one channel extending longitudinally along an exterior surface of the stem at least in part through discontinuities in at least one of the first flange and the first groove. Depending on the embodiment, such a longitudinal extending channel may, for example, assist in the delivery of fluid to the inter-dental space. Such fluid could include, for example, dentally-active material as defined hereinabove, or water. In some such embodiments, the stem has at least one opening located proximate the at least one channel, and the stem has a hollow portion fluidly connected to the at least one opening, whereby fluid can flow through the hollow portion through the at least one opening and into the at least one channel. In some embodiments, the fluid may be stored within the stem and/or the handle. In some embodiments, the fluid may be stored in a reservoir attached to the handle. In some such embodiments, the fluid may be released and forced to flow via positive pressure being applied to the reservoir. In some such embodiments, the fluid may be caused to enter the reservoir (to fill the reservoir for later use) through the openings via negative pressure in the reservoir (e.g. similar to an eyedropper). In some embodiments there are multiple such channels having any number of the above characteristics. In some such embodiments, a pump may pump the fluid from the reservoir.

In some embodiments, an exterior of the stem has a plurality of openings and at least one hollow portion fluidly connected to the plurality of openings, whereby fluid can flow through the hollow portion through the plurality of openings. In some embodiments, at least some of the plurality of openings are located in the valley(s) between successive turns of the flange(s). (As was discussed hereinabove, should fluid enter the groove(s) and/or valley(s) in a portion of the stem not then located in the inter-dental area, a rotation of the stem may cause the fluid to flow from its then current location through the groove(s) and/or valley(s) to the inter-dental area for delivery thereto.) In some embodiments, the fluid may be stored within the stem and/or the handle. In some embodiments, the fluid may be stored in a reservoir attached to the handle. In some such embodiments, the fluid may be released and forced to flow via positive pressure being applied to the reservoir. In some such embodiments, the fluid may be caused to enter the reservoir (to fill the reservoir for later use) through the openings via negative pressure in the reservoir (e g similar to an eyedropper). In some such embodiments, a pump may pump the fluid from the reservoir.

In some embodiments, the dental device further comprises at least one channel in a valley formed between successive turns of the first flange. Depending on the embodiment, such a channel may serve to increase the volume of the valley located between successive turns of the first flange, this increasing the ability of the valley to assist in the transportation of material as described hereinabove. In some embodiments there are multiple such channels.

In some embodiments, at least a portion of the stem is at least one of coated and impregnated with a dentally-active material(s). In this respect, rather than (or in addition to) dipping the stem into a dentally-active material, a dentally-active material may be in or on the stem itself. Such coating or impregnated material, for example, could have been applied at the time of manufacturing of the stem. In some embodiments such dentally-active material may act as a catalyst or in some way combine with another substance that may be present in the mouth such as, for example, but not limited to, saliva, bacteria, biofilm, water, residual mouthwash, toothpaste, or any other medicament varnish, paste, gel slurry which is carried to the mouth so as to activate or become activated in order to perform by way of, an example, a therapeutic, cleansing, whitening or other function.

It should also be understood that a portion of the stem (including the flanges and/or the grooves) may have a dentally-active material sprayed thereon (in addition or in place of such coating or impregnation).

In some embodiments, the stem has at least one radial recess allowing for bending of the stem. In some embodiments, the stem has multiple such radial recesses. Such radial recesses may allow for continued bending of the stem as the stem is rotated such that the stems stays in its intended position and/or location notwithstanding such rotation. Between different embodiments, various physical characteristics (e.g. shape, size, location, etc.) of such radial recess(es) may vary. No particular such physical characteristics are required. Any physical characteristics permitting the recess(es) to carry out their intended function will suffice. Where there are multiple such radial recesses such physical characteristics need not be the same for any or all of the radial recesses. Further no particular order or arrangement of multiple recesses is required.

As has been discussed hereinabove, the stem is not limited to having a single groove and a single flange. Stems having multiple grooves and/or multiple flanges are included within the present technology. In such cases it is not necessary that the number of grooves and flanges be equal. In some embodiments the number will be equal, in others there may be more grooves, in still others there may be more flanges. Thus, in some embodiments, the tip has a second groove winding therearound from a second distal point proximate the end towards the handle at least one complete around the tip to a second-groove termination point, the second groove being offset from and interwound with the first groove; and the stem has a second flange projecting outward therefrom and winding therearound, the second flange extending away from the handle from a second proximal point towards the end of the tip to a second-flange termination point, the second flange being offset from and interwound with the first flange.

It should be noted that the properties of the first groove and/or first flange described above can also be applied (with the necessary changes being made) to the second (or additional) groove(s) and/or second (or additional) flange(s).

In some embodiments, the dental device further comprises a plurality of bristles extending outwardly from radially around the stem towards the end of the tip. These bristles may, for example, be active in assisting of cleaning of the teeth. The ends of the bristles form an outer dentally-active edge analogous to the cleaning surface of a common toothbrush. In some such embodiments, an even outer dentally-active edge is formed by the bristles. In some such embodiments, an outwardly sloping outer dentally-active edge is formed by the bristles. In some such embodiments, an inwardly sloping outer dentally-active edge is formed by the bristles. In some embodiments, the slope of the outer edge may vary with the outer edge's intended function, i.e. which teeth it is intended that they assist in cleaning.

In some embodiments, the dental device further comprises a dome-shaped cup extending outwardly from radially around the stem towards the tip for assisting in cleaning the teeth. The cup is relatively flexible and may be made of any conventional dentally-compatible material such as rubber, silicone or plastic. The cup may have additional structures that assist in cleaning the teeth such as, for example, ribs, ridges or abrasive surface.

In some embodiments, the handle has an attachment mechanism for releasable attachment of the dental device to a mechanized device (e.g. a motor, a pump, a sonic device or an ultrasonic device) or a manual device (e.g. a hand tool, toothbrush, etc.). Depending on the embodiment, any number of conventional attachment mechanisms may be suitable. Such mechanisms include friction fitting devices, mechanical locking or interlocking devices, mechanical fasteners, etc.

In some embodiments, the device further comprises a cover sized to releasably cover the stem when the device is not in use. In some such embodiments, the cover may be releasably attachable to the handle of the device. In some such embodiments, the cover may serve as a reservoir of a dentally-active material, e.g. into which the stem may be dipped. In some such embodiments, the cover may have a valve (e.g. a one-way valve) for filling the reservoir with a dentally-active material.

In another aspect, embodiments of the present technology include a method of cleaning an area between two teeth comprising inserting at least a portion of the stem of the dental device described hereinabove between the teeth, and rotating the stem thereof.

In the context of the present specification, the words "first", "second", etc. have been used as adjectives only for the purpose of allowing for distinction between the nouns that they modify from one another, and not for the purpose of describing any particular relationship between those nouns. Thus, for example, it should be understood that, the use of the terms "first groove" and "second groove" is not intended to imply any particular order, type, chronology, hierarchy or ranking (for example) of/between the grooves.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

In the Figures, there are shown various dental devices 10, 110, 210, etc. It is to be expressly understood that the various dental devices 10, 110, 210, etc. are merely some embodiments of the present technology. Thus, the description thereof that follows is intended to be only a description of illustrative examples of the present technology. This description is not intended to define the scope or set forth the bounds of the present technology. In some cases, what are believed to be helpful examples of modifications to dental devices 10, 110, 210, may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition it is to be understood that the dental devices 10, 110, 210, may provide in certain instances simple embodiments of the present technology, and that where such is the case they have been presented in this manner as an aid to understanding. As persons skilled in the art would understand, various embodiments of the present technology may be of a greater complexity.

Figure 1:
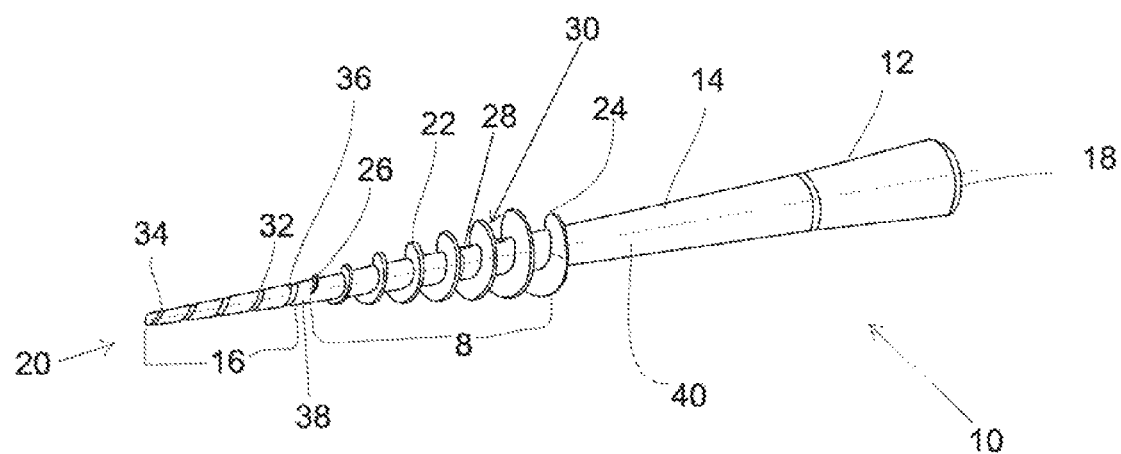
FIG. 1 is a perspective view of a dental device being a first embodiment of the present technology.

In FIG. 1, there is shown a dental device 10 being a first embodiment of the present technology. The dental device 10 has a handle 12 and stem 14 extending therefrom. The stem 14 has a tip 16. In this embodiment, the handle 12, stem 14, and tip 16 have been unitarily formed from plastic via an injection molding process. In this embodiment handle 12, stem 14, and tip 16 continuously taper from an end 18 of the handle 12 to an end 20 of the tip 16. The tip 16 is solid and is sized so as to be able to fit within an inter-dental space between to adjacent teeth. The stem 14 has a flange 22 projecting outward therefrom and winding therearound. The flange 22 extends away from the handle 12 from a proximal point 24 to a flange termination point 26. The flange 22 is in the form of a continuous left-handed helix. In between turns of the flange 22 are openings 28 which fluidly communicate with a hollow chamber (not shown) in the handle 12, allowing for the delivery of fluid into the valley 30 formed between successive turns of the flange 22.

The tip 16 has a groove 32 formed therein and winding therearound. The groove 32 extends from a distal point 34 proximate the end 20 of the tip 16 towards the handle 12 to a groove termination point 36. In this embodiment, the groove termination point 36 is axial offset from the flange termination point 26 with the groove termination point 36 being closer to the end 20 of the tip 16 than is the flange termination point 26. Thus there is an axial "gap" 38 between the groove termination point 36 and the flange termination point 26. The groove is in the form of a continuous left-handed helix.

The end 18 of the handle 12 has an attachment mechanism (not shown) for releasably attaching the dental device to a motorized device. In addition, the handle is sufficiently large enough to be held and turned by hand.

The dental device 10 may be used to clean the inter-dental area between two adjacent teeth as was described hereinabove. For example, the tip 16 of the stem 14 may be inserted into the inter-dental area and push therein until resistance is felt. Depending on the size and shape of the inter-dental area into which the stem 14 is being inserted, at least one of the groove 32 and flange 22 will be present in the inter-dental area and will contact the teeth along with the exterior (outer) surface 40 of the stem 14. The area of contact of the teeth with the stem 14 will be cleaned in part by the mechanical action of the contact. Thus the stem 14 may be repeatedly removed and re-inserted into the inter-dental area in one aspect of the cleaning. Foreign materials (food debris, plaque, etc.) in the inter-dental area may be pushed out the lingual side of the teeth as the stem 14 is inserted into the inter-dental area or such materials may be trapped within the groove 32 and/or valley 30 created by successive turns of the flange 22 of the device 10 and may be removed from the inter-dental area when the stem 14 is removed.

The stem 14 may also be rotated (be it manually or with mechanized assistance) once inserted. In this respect, the groove 32 and flange 22 are structured and arranged on the stem (in particular by being wound therearound) to assist with cleaning inter-dental area in an additional manner. When the stem 14 is rotated in a counter-clockwise direction, this rotation may assist in causing the stem 14 to be drawn deeper into the inter-dental area as the groove 32 may act to grip the teeth (in a screw-like manner). This rotation may also assist in extracting foreign materials from the inter-dental area in a "drill-like fashion" as described above. Alternatively, when the stem 14 is rotated in the clockwise direction, this rotation may also assist in extracting foreign materials from the inter-dental area, by entrapping them within the groove 22 and/or within the valley 40 created by successive turns of the flange 22 and transporting them through the inter-dental area to the lingual side of the teeth. Rotation in either direction may also assist in cleaning in the inter-dental area via friction while contacting the teeth.

As was discussed above, the groove 32 and flange 22 of the stem 14 may also serve a second purpose, to assist in delivering dentally-active materials to the inter-dental area. In this respect, for example, dentally-active material within the hollow chamber in the handle 12 may exit the openings 28 and enter the valley 30 between successive turns of the flange 22. When the stop is rotated clockwise, this dentally-active material will travel within the valley 40 to the inter-dental area and be delivered there. A significant amount of delivered material remains in the inter-dental area after the device is removed. Thus, the inter-dental area may be simultaneously cleaned (by friction) and, for example, be medicated (e.g. fluorinated via the delivery of fluorinated materials) in this manner as well.

Figure 2:
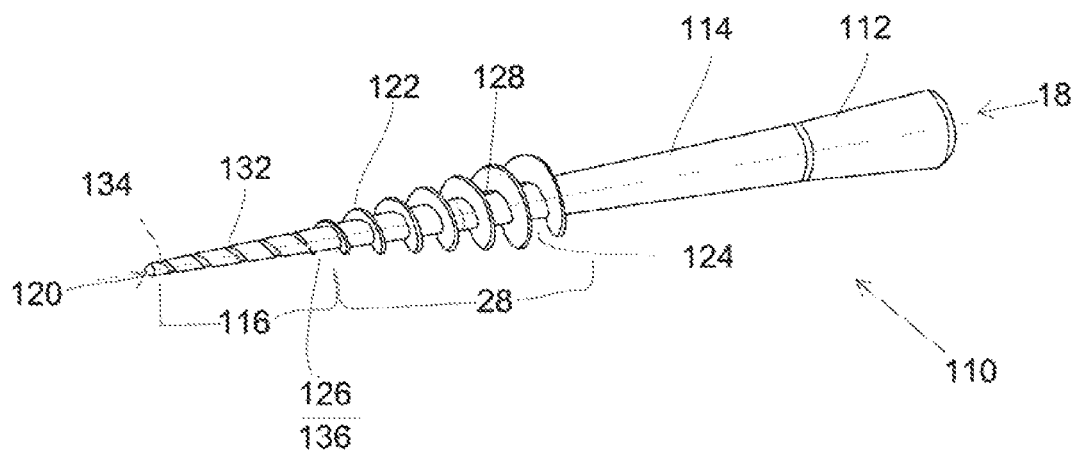
FIG. 2 is a perspective view of a dental device being a second embodiment of the present technology.

In FIG. 2, there is shown a dental device 110 being a second embodiment of the present technology. The dental device 110 has a handle 112 and stem 114 extending therefrom. The stem 114 has a tip 116. In this embodiment, the handle 112, stem 114, and tip 116 have been unitarily formed from plastic via an injection molding process. In this embodiment handle 112, stem 114, and tip 116 continuously taper from an end 118 of the handle 112 to an end 120 of the tip 116. The tip 116 is solid and is sized so as to be able to fit within an inter-dental space between to adjacent teeth. The stem 114 has a flange 122 projecting outward therefrom and winding therearound. The flange 122 extends away from the handle 112 from a proximal point 124 to a flange termination point 126. The flange 122 is in the form of a continuous right-handed helix. In between turns of the flange 122 are openings 128 which fluidly communicate with a hollow chamber (not shown) in the handle 112, allowing for the delivery of fluid into the valley 130 formed between successive turns of the flange 122.

The tip 116 has a groove 132 formed therein and winding therearound. The groove 132 extends from a distal point 134 proximate the end 120 of the tip 116 towards the handle 112 to a groove termination point 136. In this embodiment, the groove termination point 136 and the flange termination point 126 are the same point. Thus, the groove 132 is continuous with the flange 122. The groove is in the form of a continuous right-handed helix.

The end 118 of the handle 112 has an attachment mechanism (not shown) for releasably attaching the dental device to a motorized device. In addition, the handle 12 is sufficiently large enough to be held and turned by hand.

Figure 3:
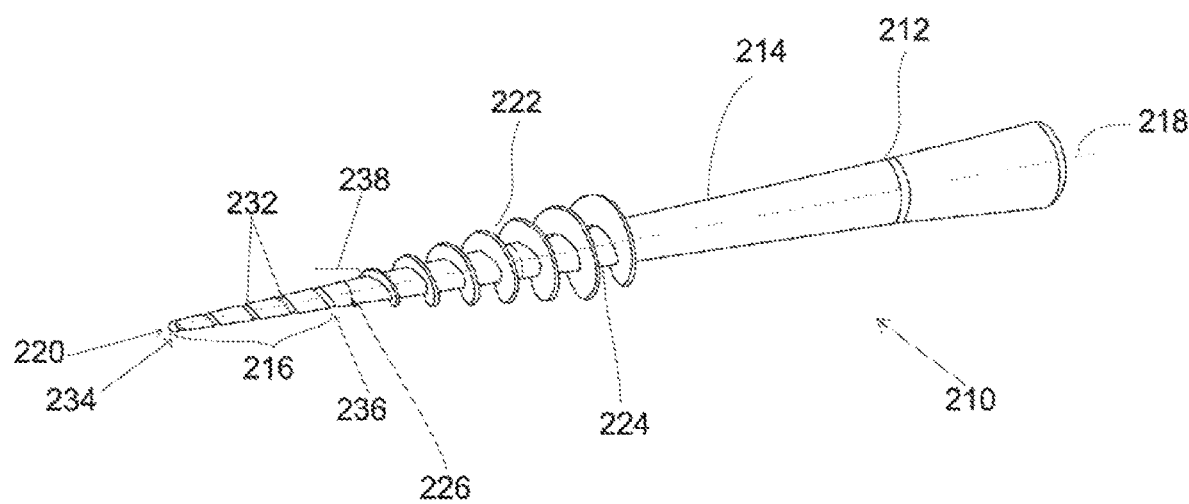
FIG. 3 is a perspective view of a dental device being a third embodiment of the present technology.

In FIG. 3, there is shown a dental device 210 being a third embodiment of the present technology. The dental device 210 has a handle 212 and stem 114 extending therefrom. The stem 214 has a tip 216. In this embodiment, the handle 212, stem 214, and tip 216 have been unitarily formed from plastic via an injection molding process. In this embodiment handle 212, stem 214, and tip 216 continuously taper from an end 218 of the handle 212 to an end 220 of the tip 216. The tip 216 is solid and is sized so as to be able to fit within an inter-dental space between to adjacent teeth. The stem 214 has a flange 222 projecting outward therefrom and winding therearound. The flange 222 extends away from the handle 212 from a proximal point 224 to a flange termination point 226. The flange 222 is in the form of a continuous right-handed helix.

The tip 216 has a groove 232 formed therein and winding therearound. The groove 232 extends from a distal point 234 proximate the end 220 of the tip 216 towards the handle 212 to a groove termination point 236. In this embodiment, the groove termination point 236 is axial offset from the flange termination point 226 with the groove termination point 236 being closer to the end 220 of the tip 216 than is the flange termination point 226. Thus there is an axial "gap" 238 between the groove termination point 36 and the flange termination point 26. The groove is in the form of a continuous right-handed helix.

The end 218 of the handle 212 has an attachment mechanism (not shown) for releasably attaching the dental device to a motorized device. In addition, the handle 212 is sufficiently large enough to be held and turned by hand.

Figure 4:
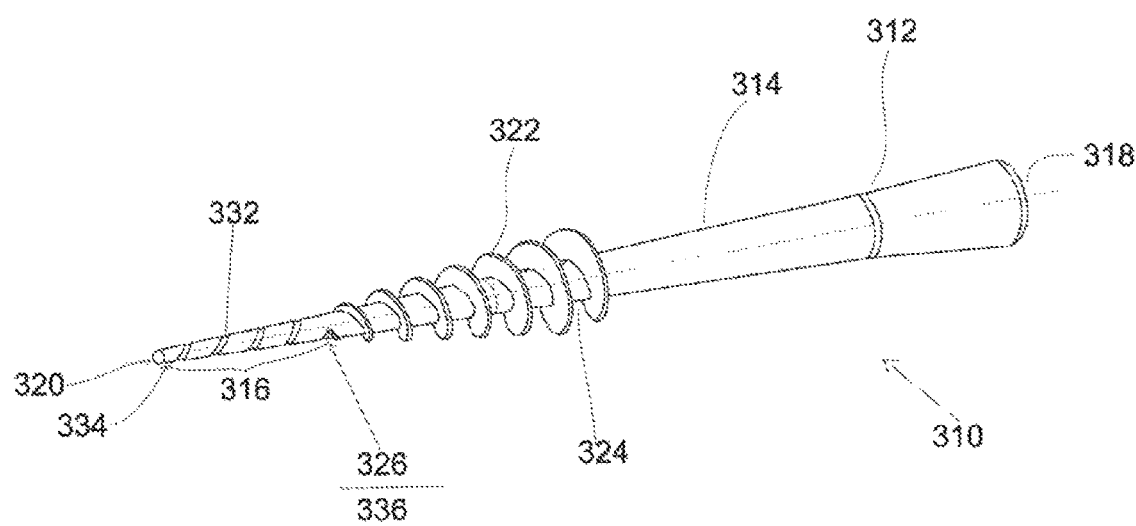
FIG. 4 is a perspective view of a dental device being a fourth embodiment of the present technology.

In FIG. 4, there is shown a dental device 310 being a fourth embodiment of the present technology. The dental device 310 has a handle 312 and stem 314 extending therefrom. The stem 314 has a tip 316. In this embodiment, the handle 312, stem 314, and tip 316 have been unitarily formed from plastic via an injection molding process. In this embodiment handle 312, stem 314, and tip 316 continuously taper from an end 318 of the handle 312 to an end 320 of the tip 316. The tip 316 is solid and is sized so as to be able to fit within an inter-dental space between to adjacent teeth. The stem 314 has a flange 322 projecting outward therefrom and winding therearound. The flange 332 extends away from the handle 312 from a proximal point 324 to a flange termination point 326. The flange 322 is in the form of a continuous right-handed helix.

The tip 316 has a groove 332 formed therein and winding therearound. The groove 332 extends from a distal point 334 proximate the end 320 of the tip 316 towards the handle 312 to a groove termination point 336. In this embodiment, the groove termination point 336 and the flange termination point 326 are the same point. The groove 332 is, however, in the form of a continuous left-handed helix.

The end 318 of the handle 312 has an attachment mechanism (not shown) for releasably attaching the dental device to a motorized device. In addition, the handle 312 is sufficiently large enough to be held and turned by hand.

Figure 5:
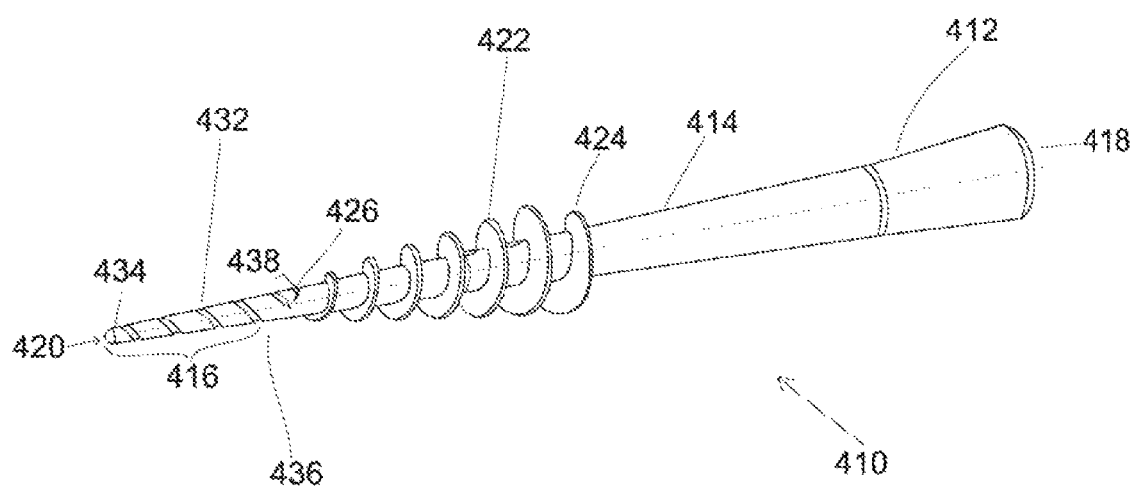
FIG. 5 is a perspective view of a dental device being a fifth embodiment of the present technology.

In FIG. 5, there is shown a dental device 410 being a fifth embodiment of the present technology. The dental device 410 has a handle 412 and stem 414 extending therefrom. The stem 414 has a tip 416. In this embodiment, the handle 412, stem 414, and tip 416 have been unitarily formed from plastic via an injection molding process. In this embodiment handle 412, stem 414, and tip 416 continuously taper from an end 418 of the handle 412 to an end 420 of the tip 416. The tip 416 is solid and is sized so as to be able to fit within an inter-dental space between to adjacent teeth. The stem 414 has a flange 422 projecting outward therefrom and winding therearound. The flange 432 extends away from the handle 412 from a proximal point 424 to a flange termination point 426. The flange 322 is in the form of a continuous left-handed helix.

The tip 416 has a groove 432 formed therein and winding therearound. The groove 432 extends from a distal point 434 proximate the end 420 of the tip 416 towards the handle 412 to a groove termination point 436. In this embodiment, the groove termination point 436 is axial offset from the flange termination point 426 with the groove termination point 436 being closer to the end 420 of the tip 416 than is the flange termination point 426. Thus there is an axial "gap" 438 between the groove termination point 436 and the flange termination point 426. The groove 432 is, however, in the form of a continuous left-handed helix.

The end 418 of the handle 412 has an attachment mechanism (not shown) for releasably attaching the dental device to a motorized device. In addition, the handle 412 is sufficiently large enough to be held and turned by hand.

Figure 6:
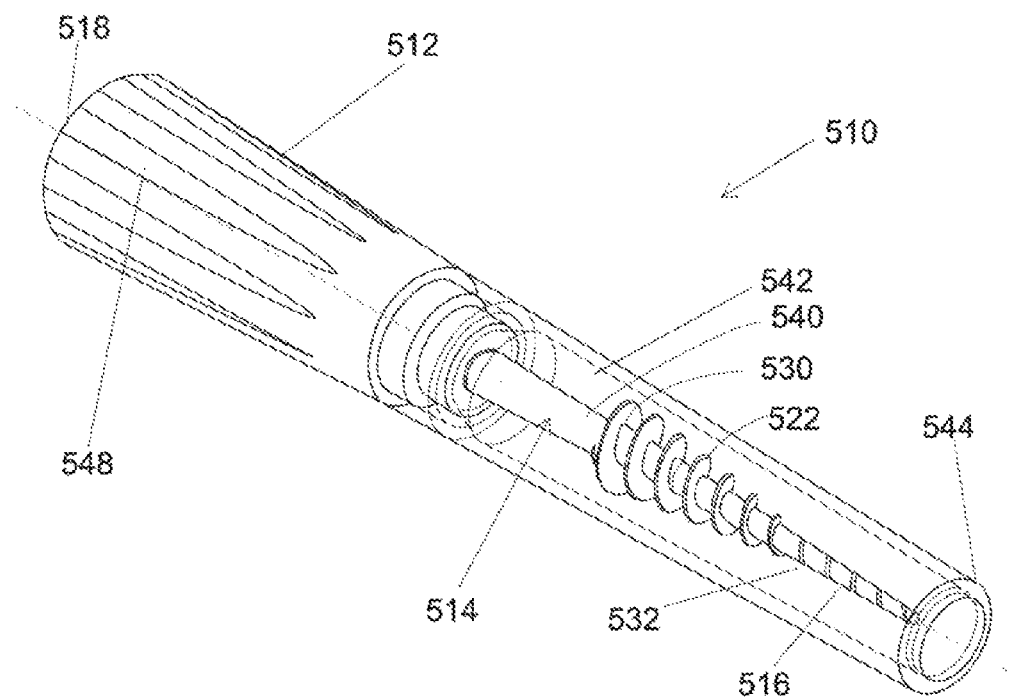
FIG. 6 is a perspective view of a dental device being a sixth embodiment of the present technology.

In FIG. 6, there is shown a dental device 510 being a sixth embodiment of the present technology. The dental device 510 has a handle 512 and stem 514 extending therefrom. The stem 516 has a tip 516. In this embodiment, the handle 512, stem 514, and tip 516 have been unitarily formed from plastic via an injection molding process. In this embodiment, dental device has a cover 542 that covers the stem 514. The cover 542 is releasably attached to the handle 512 of the device 510 via a screw-type attachment mechanism 546. When not in use (covering the stem 514), the end 544 of the cover 542 may be inserted into the end 518 of the handle 512 and releasably retained therein. In this embodiment, the handle 512 has a series of grooves 548 allowing for easier manipulation thereof.

Figure 7:
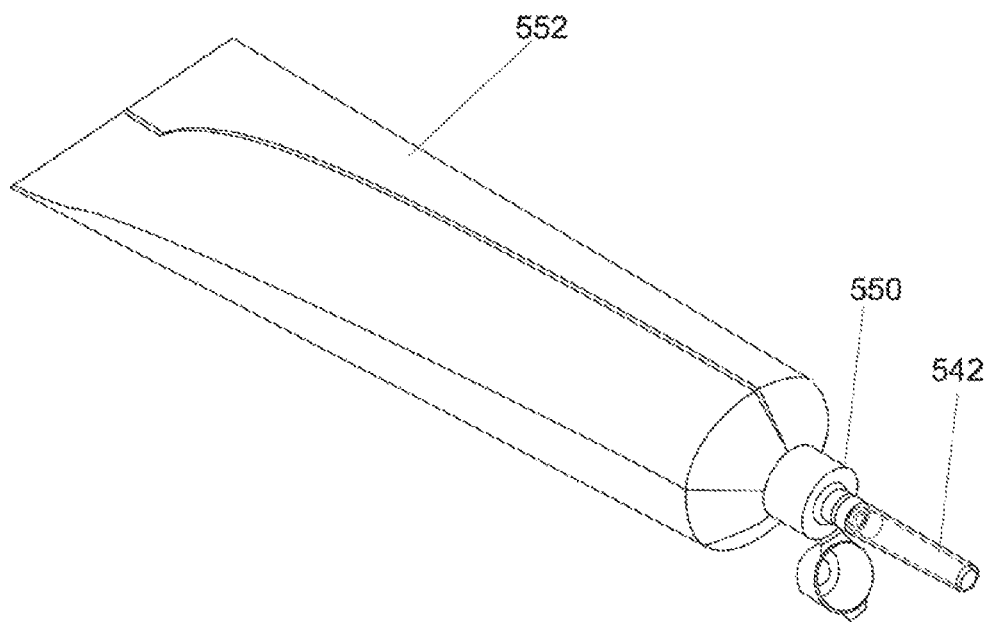
FIG. 7 is a perspective view of a cover of the sixth embodiment attached to a standard toothpaste tube.

FIG. 7 shows the cover 542 of FIG. 6 releasably attached to a standard tube of toothpaste 552 via an adapter 550. Adapter 550 allows the cover 542 to be filled (or refilled) with dentally-active material (e.g. toothpaste) (adapter 550 also allows air to exit the cover 542 while the cover 542 is being filled). Once the cover 542 is filled with the desired amount of toothpaste it is removed from the adapter 550 and the stem 514 of the device 510 is inserted therein. In this manner the toothpaste will coat the exterior surface 540 of the stem 514 including the flange 522, the valley 530 between successive turns of the flange 522, and the groove 632. Toothpaste can thus be delivered to the inter-dental area when the device 510 is in use as is described hereinabove.

Figure 8:
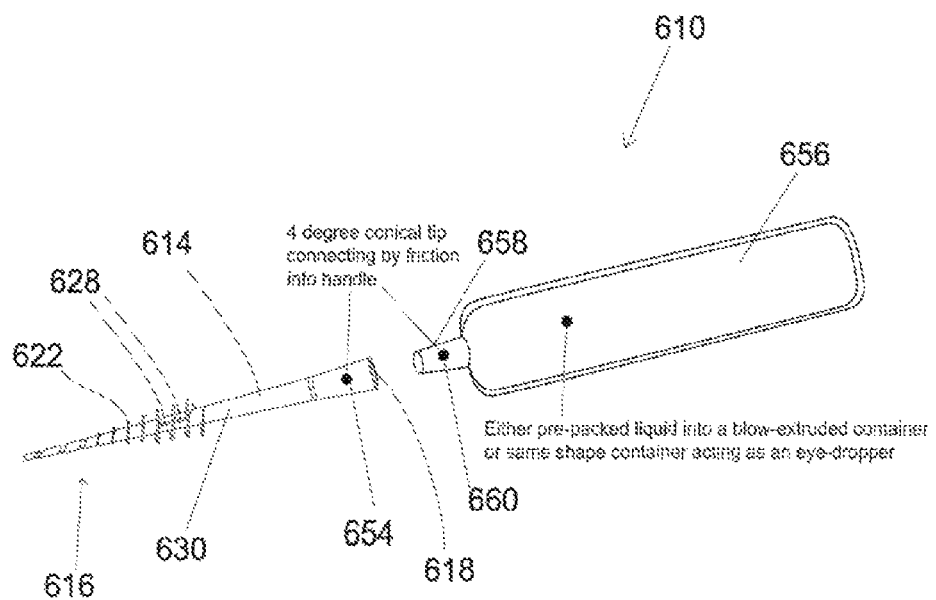
FIG. 8 is a perspective view of a dental device being a seventh embodiment of the present technology, shown with a reservoir.
Figure 9A:
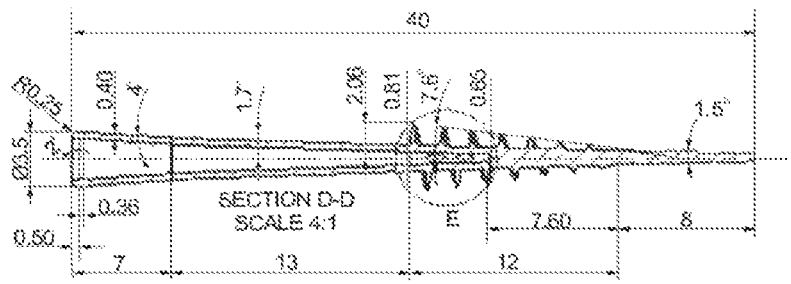
FIGS. 9A-F are engineering drawings of an eighth embodiment of the present technology.
Figure 9B:
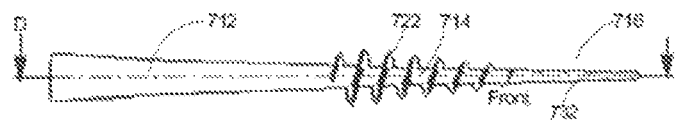
Figure 9C:
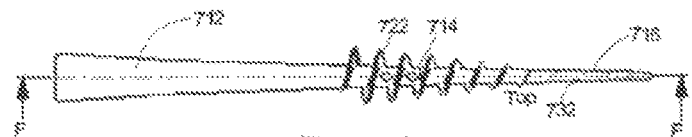
Figure 9D:
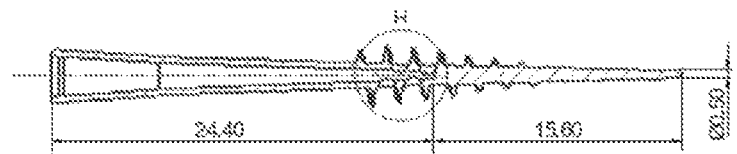
Figure 9E:
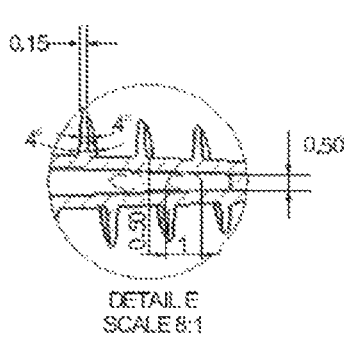
Figure 9F:
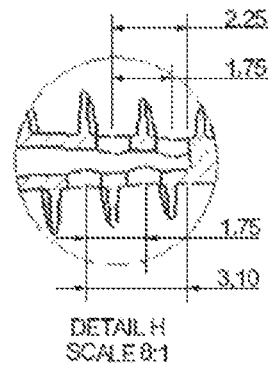

In FIG. 8, there is shown a dental device 610 being a seventh embodiment of the present technology. The dental device 610 has a handle 612 and stem 614 extending therefrom. The stem 614 has a tip 616. In this embodiment, the handle 612, stem 614, and tip 616 have been unitarily formed from plastic via an injection molding process. The stem 614 has a flange 622 projecting outward therefrom and winding therearound. The flange 622 extends away from the handle 612. The flange 622 is in the form of a continuous left-handed helix. In between turns of the flange 622 are openings 628 which fluidly communicate with a hollow chamber (not shown) in the handle 612, allowing for the delivery of fluid into the valley 630 formed between successive turns of the flange 622.

The hollow chamber extends from the openings 628 to the end 618 of the handle 612. The end 618 of the handle 612 is open allowing for the insertion therein of the stem 658 of a reservoir 658. The stem 658 of the reservoir 656 and the opening in the end of the handle 612 are appropriately sized and shaped to create a seal therebetween. The stem 658 has protrusions 660 thereon which cooperate with dimples 654 in the handle 612 to releasably attach the reservoir 658 to the handle 612 of the device 610. Once the reservoir 656 is attached to the device 610 it may be manually squeezed to expel a dentally-active material contained therein out through an opening (not shown) in the stem 658 of the reservoir and into the hollow chamber of the handle 612 and stem 614 of the device 610. Continued pressure exerted on the reservoir 656 will force the dentally-active material through the hollow chamber, out of the openings 628 and into the valley 630 between successive turns of the flange 622 where it can be delivered to the inter-dental area as described hereinabove. In this embodiment, reservoir 658 may also act in a manner similar to an eye-dropper such that negative pressure in the reservoir 658 (owing to a squeezed reservoir 658 being released) may cause fluid to enter the hollow chamber in the stem 614 and handle 612 through the openings 628 and travel to the reservoir 656 filling it.

In FIG. 9, there is shown a dental device 710 being an eighth embodiment of the present technology. The dental device 710 has a handle 712 and a stem 714 extending therefrom. The stem 714 has a tip 716. The stem 714 has a flange 722 projecting outward therefrom and winding therearound. Flange 722 is a right-handed winding.

The tip 716 has a groove 732 formed therein and winding therearound. The groove 732 is continuous with the flange 722. Groove 732 is a right-handed winding.

In FIG. 9, some of the various dimensions of the device 710 are shown.

Figure 10:
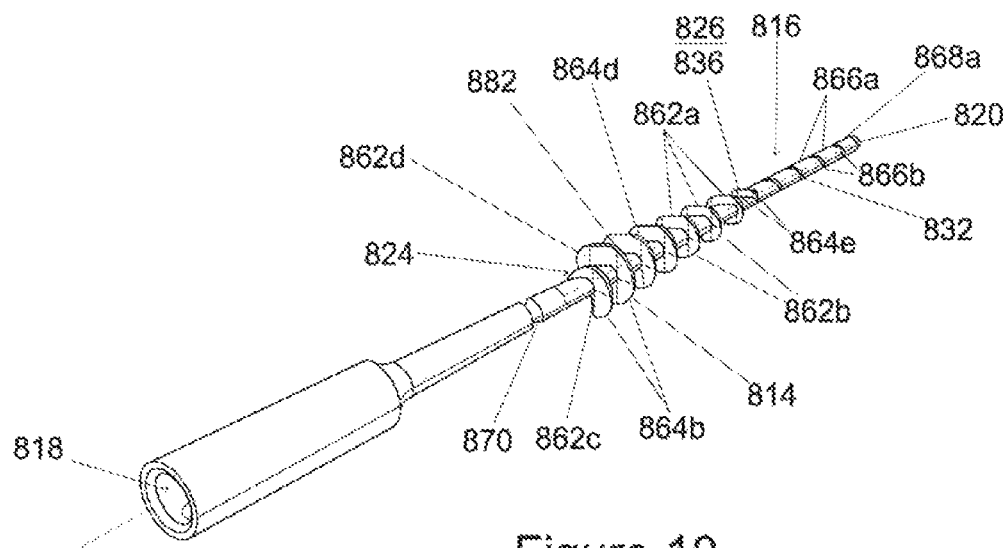
FIG. 10 is a perspective view of a dental device being a ninth embodiment of the present technology.
Figure 12:
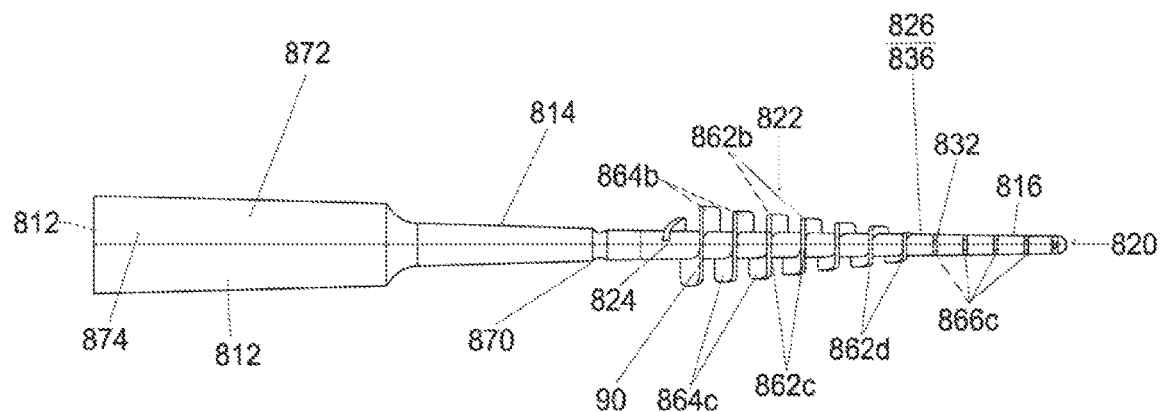
FIG. 12 is an elevation view of the dental device of FIG. 10.
Figure 14:
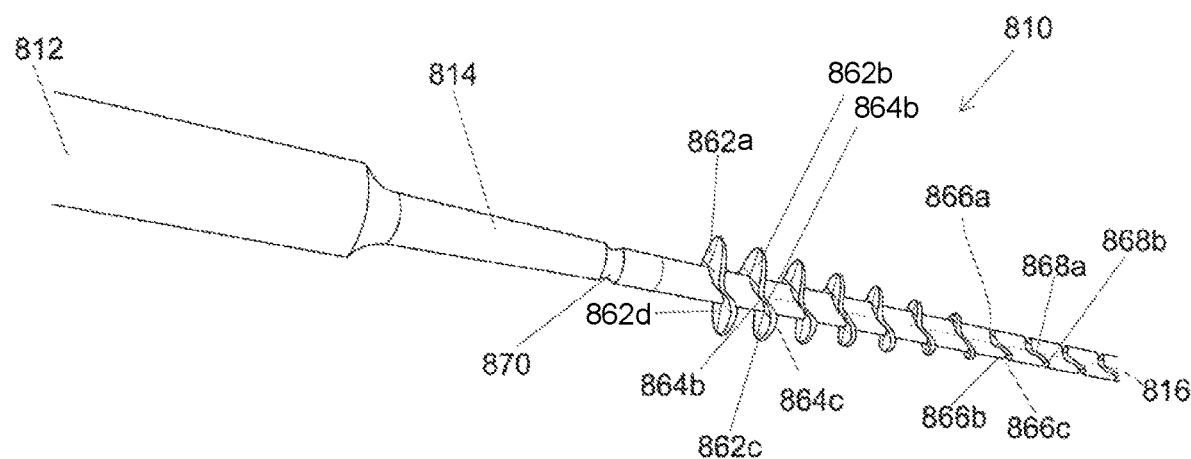
FIG. 14 is a close-up perspective view of the dental device of FIG. 10.

In FIGS. 10, 12, and 14, there is shown a dental device 810 being a ninth embodiment of the present technology. The dental device 810 has a handle 812 and a stem 814 extending therefrom. The stem 814 has a tip 816. In this embodiment, the handle 812, stem 814, and tip 816 have been unitarily formed from plastic via an injection molding process. In this embodiment a portion of the stem 814 tapers from near handle 812 to before the beginning of the tip 816. The remainder of the stem 814, including the tip 816 is cylindrical being of a uniform circular cross-section. The tip 816 is solid and is sized so as to be able to fit within an inter-dental space between to adjacent teeth. The stem 814 has a flange 822 projecting outward therefrom and winding therearound. The flange 822 extends away from the handle 812 from a proximal point 824 to a flange termination point 826. Each turn of the flange 822 has a series of four planar portions 862a, 862b, 862c, 862d interconnected by a series of curved portions 864a, 864b, 864c, 864d. Corresponding planar portions of each turn of the flange 822 are parallel (e.g. portion 862a of each turn of the flange 822 is parallel to portion 862a of other turns of the flange 862a, etc.). Flange 822 is a right-handed winding.

The tip 816 has a groove 832 formed therein and winding therearound. The groove 832 extends from a distal point 834 proximate the end 820 of the tip 816 towards the handle 812 to a groove termination point 836. In this embodiment, the groove termination point 836 and the flange termination point 826 are the same point. Thus, the groove 832 is continuous with the flange 822. Each turn of the groove 832 has a series of four linear portions 866a, 866b, 866c, 866d interconnected by a series of curved portions 868a, 868b, 868c, 868d. Corresponding linear portions of each turn of the groove 832 are parallel (e.g. portion 866a of each turn of the groove 832 is parallel to portion 866a of other turns of the groove 862a, etc.). Groove 832 is a right-handed winding.

In this embodiment there is a radial recess 870 allowing for bending of the stem 814 extending around the stem 814. Radial recess 870 is semi-circular in cross-section.

Referring to FIG. 12, in this embodiment the distal end of the handle 812 has a series of ridges 874 (shown only in FIG. 12) which facilitate turning of the handle 812. The proximal end 872 of the handle 812 is smooth to allow for friction fit of a cover (not shown) to assist in releasably retaining the cover. The end 818 of the handle 812 has an opening therein that is sized and dimensioned to releasably retain therein a cover (not shown) when not in use (covering the stem 814).

Figure 11:
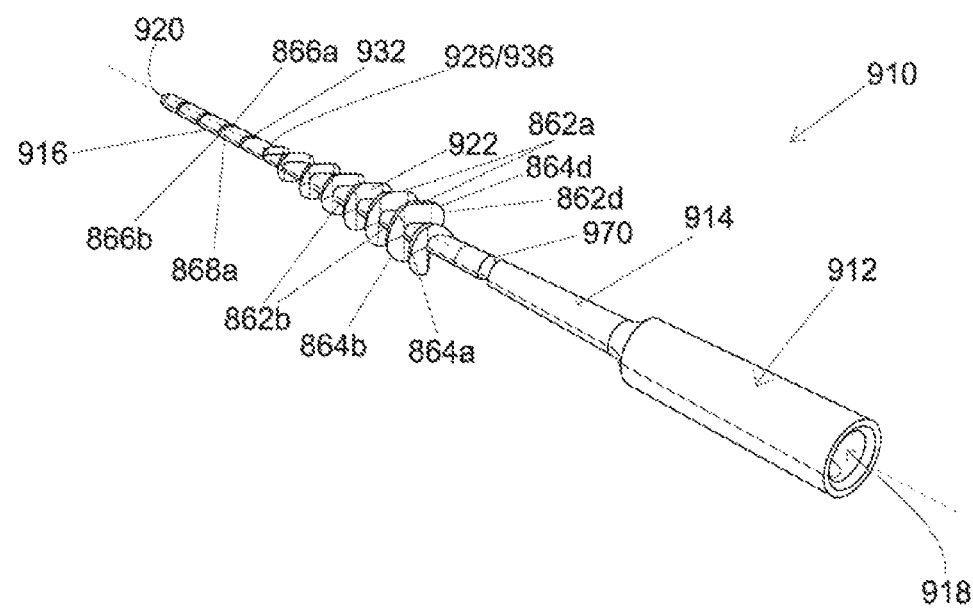
FIG. 11 is a perspective view of a dental device being a tenth embodiment of the present technology.
Figure 13:
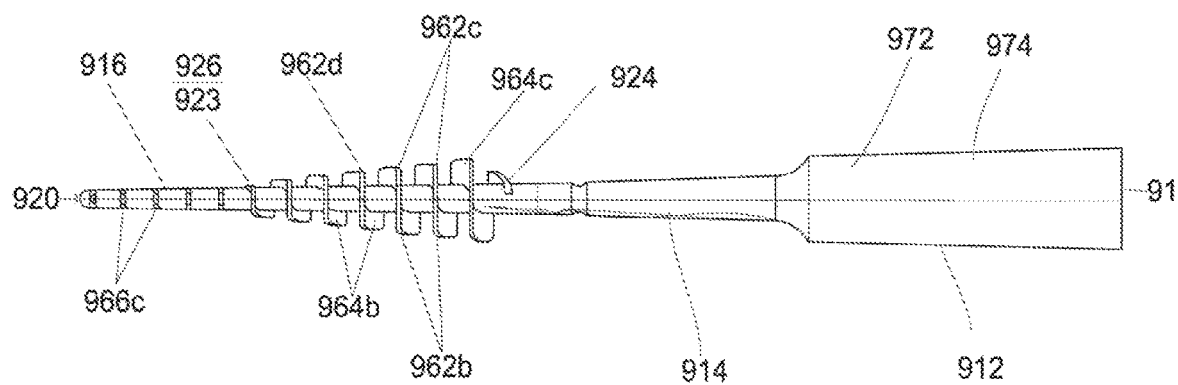
FIG. 13 is an elevation view of the dental device of FIG. 11.
Figure 15:
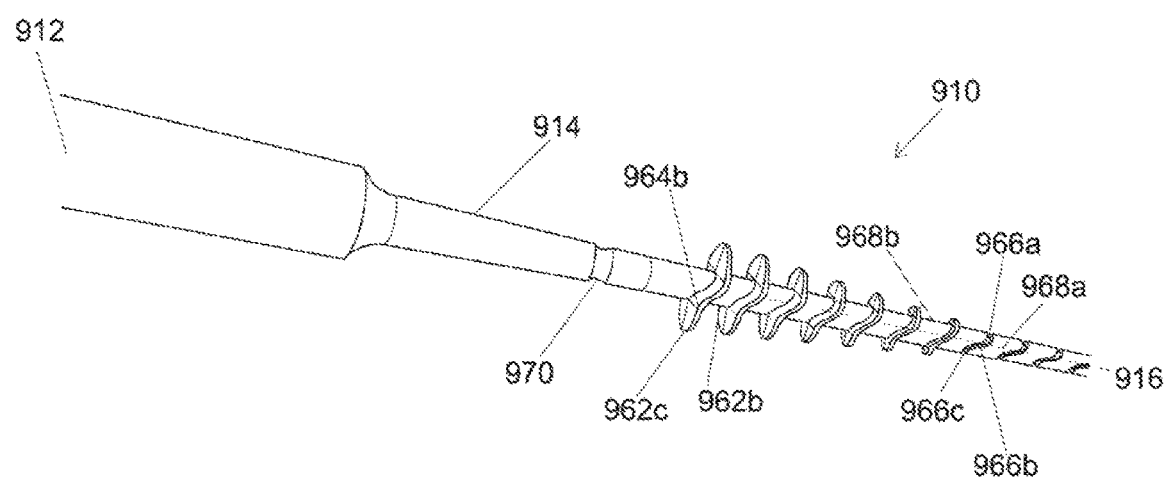
FIG. 15 is a close-up perspective view of the dental device of FIG. 11.

In FIGS. 11, 13, and 15, there is shown a dental device 910 being a tenth embodiment of the present technology. The dental device 910 has a handle 912 and a stem 914 extending therefrom. The stem 914 has a tip 916. In this embodiment, the handle 912, stem 914, and tip 916 have been unitarily formed from plastic via an injection molding process. In this embodiment a portion of the stem 914 tapers from near handle 912 to before the beginning of the tip 916. The remainder of the stem 914, including the tip 916 is cylindrical being of a uniform circular cross-section. The tip 916 is solid and is sized so as to be able to fit within an inter-dental space between to adjacent teeth. The stem 914 has a flange 922 projecting outward therefrom and winding therearound. The flange 922 extends away from the handle 912 from a proximal point 924 to a flange termination point 926. Each turn of the flange 922 has a series of four planar portions 962a, 962b, 962c, 962d interconnected by a series of curved portions 964a, 964b, 964c, 964d. Corresponding planar portions of each turn of the flange 922 are parallel (e.g. portion 962a of each turn of the flange 922 is parallel to portion 962a of other turns of the flange 962a, etc.). Flange 922 is a left-handed winding.

The tip 916 has a groove 932 formed therein and winding therearound. The groove 932 extends from a distal point 934 proximate the end 920 of the tip 916 towards the handle 912 to a groove termination point 936. In this embodiment, the groove termination point 936 and the flange termination point 926 are the same point. Thus, the groove 932 is continuous with the flange 922. Each turn of the groove 932 has a series of four linear portions 966a, 966b, 966c, 966d interconnected by a series of curved portions 968a, 968b, 968c, 968d. Corresponding linear portions of each turn of the groove 932 are parallel (e.g. portion 966a of each turn of the groove 922 is parallel to portion 966a of other turns of the groove 962a, etc.). Groove 932 is a right-handed winding.

In this embodiment there is a radial recess 970 allowing for bending of the stem 914 extending around the stem 914. Radial recess 970 is semi-circular in cross-section.

Referring to FIG. 13, in this embodiment the distal end of the handle 912 has a series of ridges 974 (shown only in FIG. 13) which facilitate turning of the handle 912. The proximal end 972 of the handle 912 is smooth to allow for friction fit of a cover (not shown) to assist in releasably retaining the cover. The end 918 of the handle 912 has an opening therein that is sized and dimensioned to releasably retain therein a cover (not shown) when not in use (covering the stem 912).

In FIG. 9, there is shown schematic of a dental device 1010 being an eleventh embodiment of the present technology. The dental device 1010 has a handle 1012 and stem 1014 extending therefrom. The stem 1014 has a tip 1016. In this embodiment the stem 1014, and tip 1016 continuously tapers from to an end 320 of the tip 316. In this embodiment, the taper is more significant than in other embodiments shown herein, such that the stem is short, stubby, and "plug-like". The stem 1014 has a flange 1022 projecting outward therefrom and winding therearound. The flange 1022 is in the form of a continuous right-handed helix. The tip 1016 has a groove 1032 formed therein and winding therearound. The groove 1032 is in the form of a continuous right-handed helix that is continuous with flange 1022.

Figure 16:
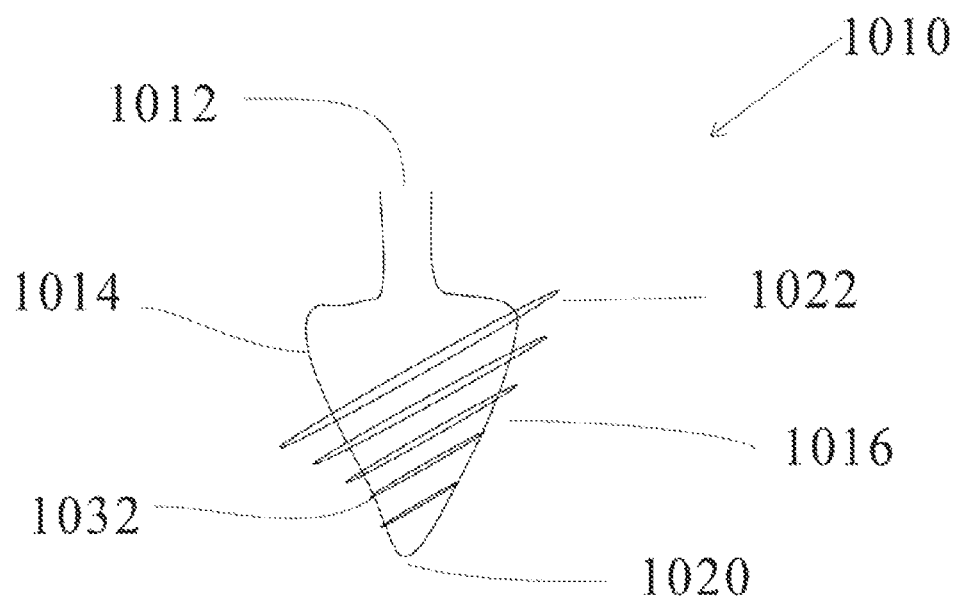
FIG. 16 is a schematic elevation view an eleventh embodiment of the present technology.

In FIG. 16, there is shown schematic of a dental device 1010 being an eleventh embodiment of the present technology. The dental device 1010 has a handle 1012 and stem 1014 extending therefrom. The stem 1014 has a tip 1016. In this embodiment the stem 1014, and tip 1016 continuously tapers from to an end 1020 of the tip 1016. In this embodiment, the taper is more significant than in other embodiments shown herein, such that the stem is short, stubby, and "plug-like". The stem 1014 has a flange 1022 projecting outward therefrom and winding therearound. The flange 1022 is in the form of a continuous right-handed helix. The tip 1016 has a groove 1032 formed therein and winding therearound. The groove 1032 is in the form of a continuous right-handed helix that is continuous with flange 1022.

Figure 17:
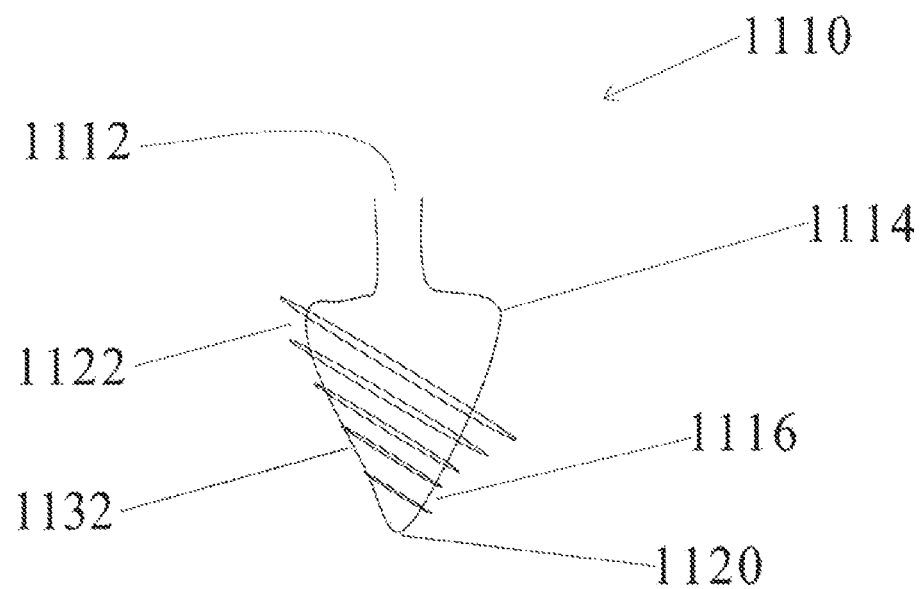
FIG. 17 is a schematic elevation view of a twelfth embodiment of the present technology.

In FIG. 17, there is shown schematic of a dental device 1110 being a twelfth embodiment of the present technology. The dental device 1110 has a handle 1112 and stem 1114 extending therefrom. The stem 1114 has a tip 1116. In this embodiment the stem 1114, and tip 1116 continuously tapers from to an end 1120 of the tip 1116. In this embodiment, the taper is more significant than in other embodiments shown herein, such that the stem is short, stubby, and "plug-like". The stem 1114 has a flange 1122 projecting outward therefrom and winding therearound. The flange 1122 is in the form of a continuous right-handed helix. The tip 1116 has a groove 1132 formed therein and winding therearound. The groove 1132 is in the form of a continuous right-handed helix that is continuous with flange 1122.

Figure 18:
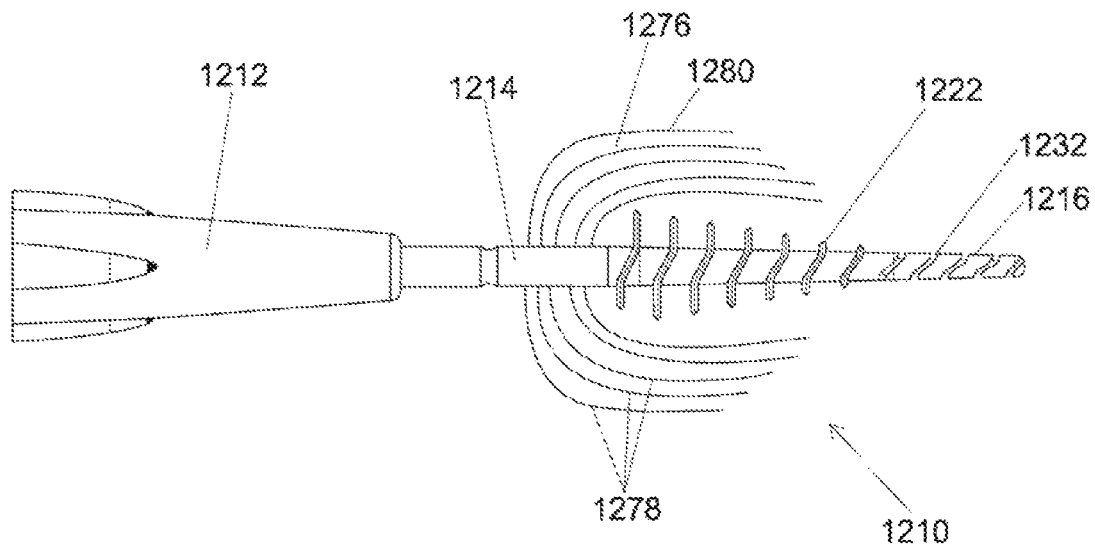
FIG. 18 is an elevation view of a dental device being a thirteenth embodiment of the present technology.

In FIG. 18, there is shown a dental device 1210 being a thirteenth embodiment of the present technology, which is similar to dental device 810. The dental device 1210 has a handle 1212 and a stem 1214 extending therefrom. The stem 1214 has a tip 1216. In this embodiment, the handle 1212, stem 1214, and tip 1216 have been unitarily formed from plastic via an injection molding process. In this embodiment a portion of the stem 1214 tapers from near handle 1212 to before the beginning of the tip 1216. The remainder of the stem 1214, including the tip 1216 is cylindrical being of a uniform circular cross-section. The tip 1216 is solid and is sized so as to be able to fit within an inter-dental space between to adjacent teeth. The stem 1214 has a flange 1222 projecting outward therefrom and winding therearound. The flange 1222 extends away from the handle 1212 from a proximal point (not labelled) to a flange termination point (not labelled). Each turn of the flange 1222 has a series of four planar portions interconnected by a series of curved portions. Corresponding planar portions of each turn of the flange 1222 are parallel. Flange 1222 is a right-handed winding.

The tip 1216 has a groove 1232 formed therein and winding therearound. The groove 1232 extends from a distal point (not labelled) proximate the end 1220 of the tip 1216 towards the handle 1212 to a groove termination point (not labelled). In this embodiment, the groove termination point and the flange termination point are the same point. Thus, the groove 1232 is continuous with the flange 1222. Each turn of the groove 1232 has a series of four linear portions interconnected by a series of curved portions. Corresponding linear portions of each turn of the groove 1232 are parallel. Groove 1232 is a right-handed winding.

In this embodiment, extending outwardly from radially around the stem 1214, is a plurality of bristles 1278 forming a brush 1276 having an outwardly sloping outer dentally-active edge 1280.

Figure 19:
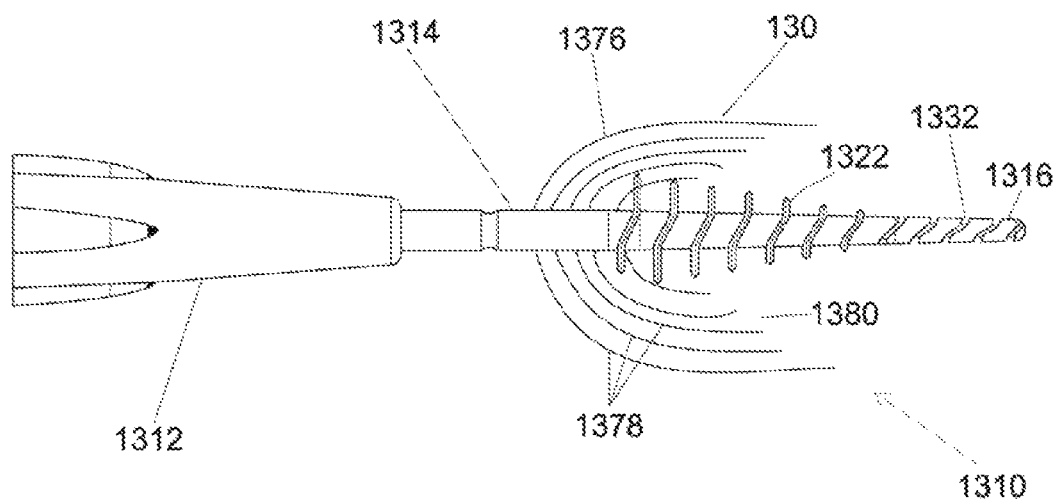
FIG. 19 is an elevation view of a dental device being a fourteenth embodiment of the present technology.

In FIG. 19, there is shown a dental device 1310 being a fourteenth embodiment of the present technology, which is similar to dental device 810. The dental device 1310 has a handle 1312 and a stem 1314 extending therefrom. The stem 1314 has a tip 1316. In this embodiment, the handle 1312, stem 1314, and tip 1316 have been unitarily formed from plastic via an injection molding process. In this embodiment a portion of the stem 1314 tapers from near handle 1312 to before the beginning of the tip 1316. The remainder of the stem 1314, including the tip 1316 is cylindrical being of a uniform circular cross-section. The tip 1316 is solid and is sized so as to be able to fit within an inter-dental space between to adjacent teeth. The stem 1314 has a flange 1322 projecting outward therefrom and winding therearound. The flange 1322 extends away from the handle 1312 from a proximal point (not labelled) to a flange termination point (not labelled). Each turn of the flange 1322 has a series of four planar portions interconnected by a series of curved portions. Corresponding planar portions of each turn of the flange 1322 are parallel. Flange 1322 is a right-handed winding.

The tip 1316 has a groove 1332 formed therein and winding therearound. The groove 1332 extends from a distal point (not labelled) proximate the end 1320 of the tip 1316 towards the handle 1312 to a groove termination point (not labelled). In this embodiment, the groove termination point and the flange termination point are the same point. Thus, the groove 1332 is continuous with the flange 1322. Each turn of the groove 1332 has a series of four linear portions interconnected by a series of curved portions. Corresponding linear portions of each turn of the groove 1332 are parallel. Groove 1332 is a right-handed winding.

In this embodiment, extending outwardly from radially around the stem 1314, is a plurality of bristles 1378 forming a brush 1376 having an inwardly sloping outer dentally-active edge 1380.

Figure 20:
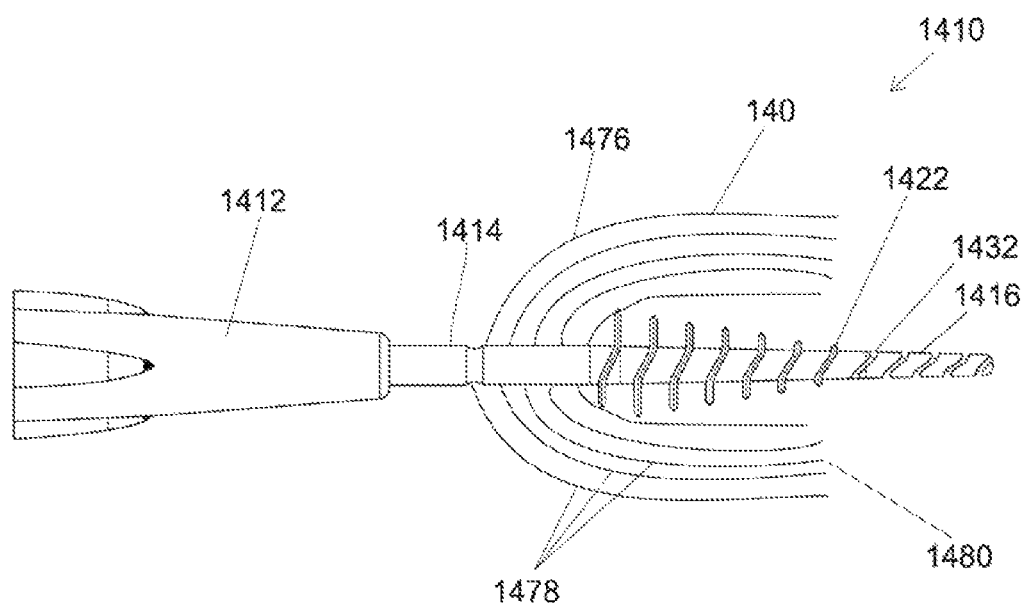
FIG. 20 is an elevation view of a dental device being a fifteenth embodiment of the present technology.

In FIG. 20, there is shown a dental device 1410 being a fifteenth embodiment of the present technology, which is similar to dental device 1410. The dental device 1410 has a handle 1412 and a stem 1414 extending therefrom. The stem 1414 has a tip 1416. In this embodiment, the handle 1412, stem 1414, and tip 1416 have been unitarily formed from plastic via an injection molding process. In this embodiment a portion of the stem 1414 tapers from near handle 1412 to before the beginning of the tip 1416. The remainder of the stem 1414, including the tip 1416 is cylindrical being of a uniform circular cross-section. The tip 1416 is solid and is sized so as to be able to fit within an inter-dental space between to adjacent teeth. The stem 1414 has a flange 1422 projecting outward therefrom and winding therearound. The flange 1422 extends away from the handle 1412 from a proximal point (not labelled) to a flange termination point (not labelled). Each turn of the flange 1422 has a series of four planar portions interconnected by a series of curved portions. Corresponding planar portions of each turn of the flange 1422 are parallel. Flange 1422 is a right-handed winding. The tip 1416 has a groove 1432 formed therein and winding therearound. The groove 1432 extends from a distal point (not labelled) proximate the end 1420 of the tip 1416 towards the handle 1412 to a groove termination point (not labelled). In this embodiment, the groove termination point and the flange termination point are the same point. Thus, the groove 1432 is continuous with the flange 1422. Each turn of the groove 1432 has a series of four linear portions interconnected by a series of curved portions. Corresponding linear portions of each turn of the groove 1432 are parallel. Groove 1432 is a right-handed winding.

In this embodiment, extending outwardly from radially around the stem 1414, is a plurality of bristles 1478 forming a brush 1476 having an even outer dentally-active edge 1480.

Figure 21:
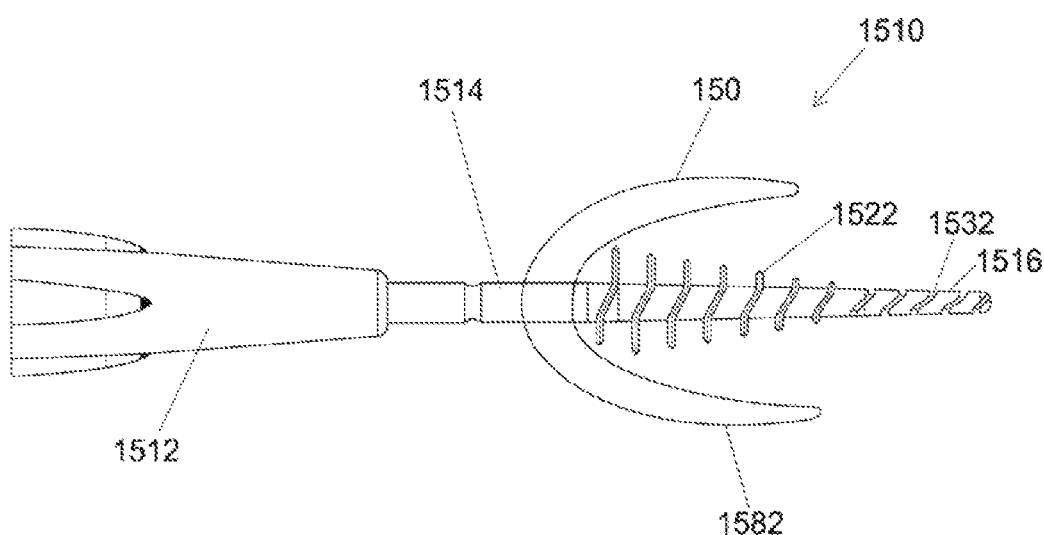
FIG. 21 is an elevation view of a dental device being a sixteenth embodiment of the present technology.

In FIG. 21, there is shown a dental device 1510 being a sixteenth embodiment of the present technology, which is similar to dental device 1510. The dental device 1510 has a handle 1512 and a stem 1514 extending therefrom. The stem 1514 has a tip 1516. In this embodiment, the handle 1512, stem 1514, and tip 1516 have been unitarily formed from plastic via an injection molding process. In this embodiment a portion of the stem 1514 tapers from near handle 1512 to before the beginning of the tip 1516. The remainder of the stem 1514, including the tip 1516 is cylindrical being of a uniform circular cross-section. The tip 1516 is solid and is sized so as to be able to fit within an inter-dental space between to adjacent teeth. The stem 1514 has a flange 1522 projecting outward therefrom and winding therearound. The flange 1522 extends away from the handle 1512 from a proximal point (not labelled) to a flange termination point (not labelled). Each turn of the flange 1522 has a series of four planar portions interconnected by a series of curved portions. Corresponding planar portions of each turn of the flange 1522 are parallel. Flange 1522 is a right-handed winding.

The tip 1516 has a groove 1532 formed therein and winding therearound. The groove 1532 extends from a distal point (not labelled) proximate the end 1520 of the tip 1516 towards the handle 1512 to a groove termination point (not labelled). In this embodiment, the groove termination point and the flange termination point are the same point. Thus, the groove 1532 is continuous with the flange 1522. Each turn of the groove 1532 has a series of four linear portions interconnected by a series of curved portions. Corresponding linear portions of each turn of the groove 1522 are parallel. Groove 1532 is a right-handed winding.

In this embodiment, extending outwardly from radially around the stem 1514, is a dome-shaped cup 1582 for assisting in cleaning the teeth.

Figure 22:
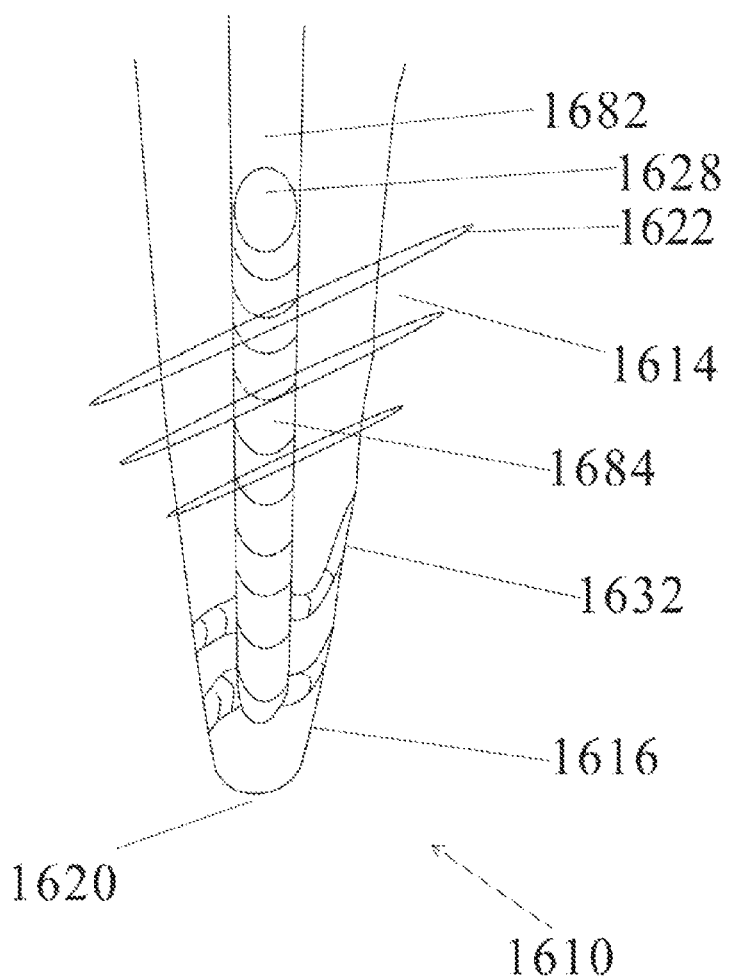
FIG. 22 is a close-up elevation view of a dental device being a seventeenth embodiment of the present technology.

In FIG. 22, there is shown a portion of a dental device 1610 being a seventeenth embodiment of the present technology. The dental device 1610 has a handle 1612 (not shown) and a stem 1614 extending therefrom. The stem 1614 has a tip 1616. The stem 1614 has a flange 1622 projecting outward therefrom and winding therearound. Flange 1622 is a discontinuous right-handed winding.

The tip 1616 has a groove 1632 formed therein and winding therearound. The groove 1632 is continuous with the flange 1622. Groove 1632 is a discontinuous right-handed winding.

In this embodiment, the discontinuities in the flange 1622 and the groove 1632 are aligned with the longitudinal axis of the stem 1614. Extending the through the discontinuities in the flange 1622 and the groove 1632 along the stem 1614 to almost the end 1620 of the tip 1616 is a channel 1684. At the other end of the channel 1684 there is an opening 1628 which communicates with a hollow portion 1682 inside of the stem 1614. Fluids may thus pass from the hollow portion 1682 through the opening 1628 and travel in the channel 1684 to the inter-dental area.

Figure 23:
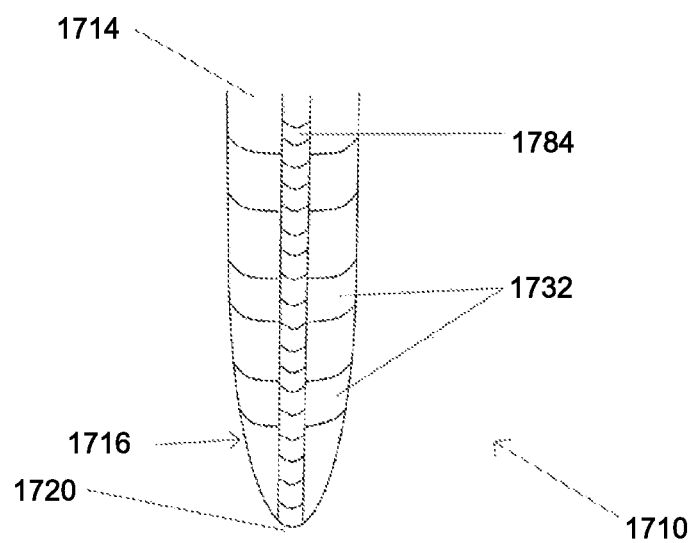
FIG. 23 is a close-up elevation view of a dental device being an eighteenth embodiment of the present technology.

In FIG. 23, there is shown a portion of a dental device 1710 being an eighteenth embodiment of the present technology. The dental device 1710 has a handle 1712 (not shown) and a stem 1714 extending therefrom. The stem 1714 has a tip 1716. The stem 1714 has a flange (not shown) projecting outward therefrom and winding therearound. The tip 1716 has a groove 1732 formed therein and winding therearound. Groove 1832 is a continuous right-handed winding.

In this embodiment, the discontinuities in the groove 1732 are aligned with the longitudinal axis of the stem 1714. Extending the through the discontinuities in the groove 1732 along the stem 1714 to almost the end 1720 of the tip 1716 is a channel 1784. Fluids may flow in the channel 1784 to the inter-dental area.

Figure 24:
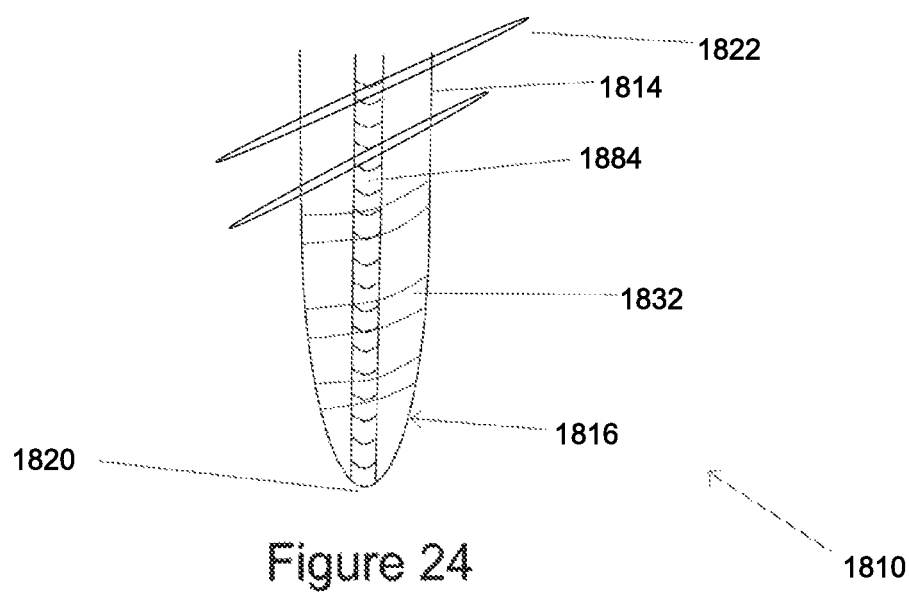
FIG. 24 is an elevation view of a dental device being a nineteenth embodiment of the present technology.

In FIG. 24, there is shown a portion of a dental device 1810 being a nineteenth embodiment of the present technology. The dental device 1810 has a handle 1812 (not shown) and a stem 1814 extending therefrom. The stem 1814 has a tip 1816. The stem 1814 has a flange 1822 projecting outward therefrom and winding therearound. Flange 1822 is a discontinuous right-handed winding.

The tip 1816 has a groove 1832 formed therein and winding therearound. The groove 1832 is continuous with the flange 1822. Groove 1832 is a continuous right-handed winding.

In this embodiment, the discontinuities in the flange 1822 and those through the groove 1832 are aligned with the longitudinal axis of the stem 1814. Extending the through the discontinuities in the flange 1822 and the groove 1832 along the stem 1814 to almost the end 1820 of the tip 1816 is a channel 1884. Fluids may flow in the channel 1884 to the inter-dental area.

Figure 25:
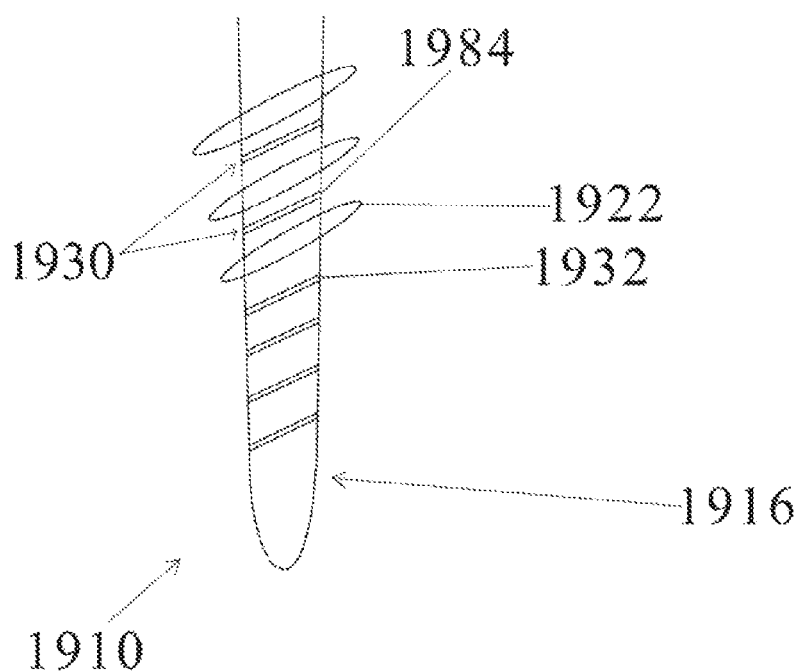
FIG. 25 is an elevation view of a dental device being a twentieth embodiment of the present technology.

In FIG. 25, there is shown a portion of a dental device 1910 being a twentieth embodiment of the present technology. The dental device 1910 has a handle 1912 (not shown) and a stem 1914 extending therefrom. The stem 1914 has a tip 1916. The stem 1914 has a flange 1922 projecting outward therefrom and winding therearound. Flange 1922 is a continuous right-handed winding.

The tip 1916 has a groove 1932 formed therein and winding therearound. The groove 1932 is continuous with the flange 1922. Groove 1932 is a continuous right-handed winding.

In this embodiment, located in between valleys 1930 created by successive turns of the flange 1932 is a channel 1984. Channel 1984 increases the volume of the valleys 1930 to assist in transporting fluid therethrough.

Figure 26:
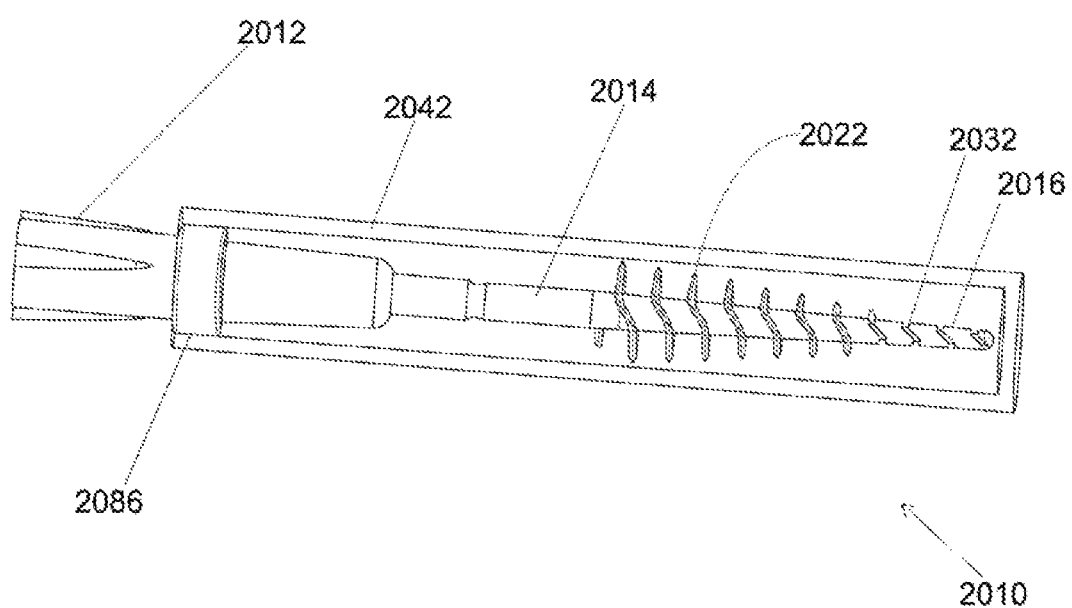
FIG. 26 is an elevation view of a dental device being a twenty-first embodiment of the present technology.

In FIG. 26, there is shown a dental device 2010 being a twenty-first embodiment of the present technology. The dental device 2010 has a handle 2012 and a stem 2014 extending therefrom. The stem 2014 has a tip 2016. The stem 2014 has a flange 2022 projecting outward therefrom and winding therearound. Flange 2022 is a right-handed winding.

The tip 2016 has a groove 2032 formed therein and winding therearound. The groove 2032 is continuous with the flange 2022. Groove 2032 is a right-handed winding.

In this embodiment, a cover 2042 covers the stem 2014 when the device 2010 is not in use. Cover 2042 is releasably attached to handle 2012 via a friction fit between the end of cover 2042 and a raised annular portion 2086 of handle 2012.

Figure 27:
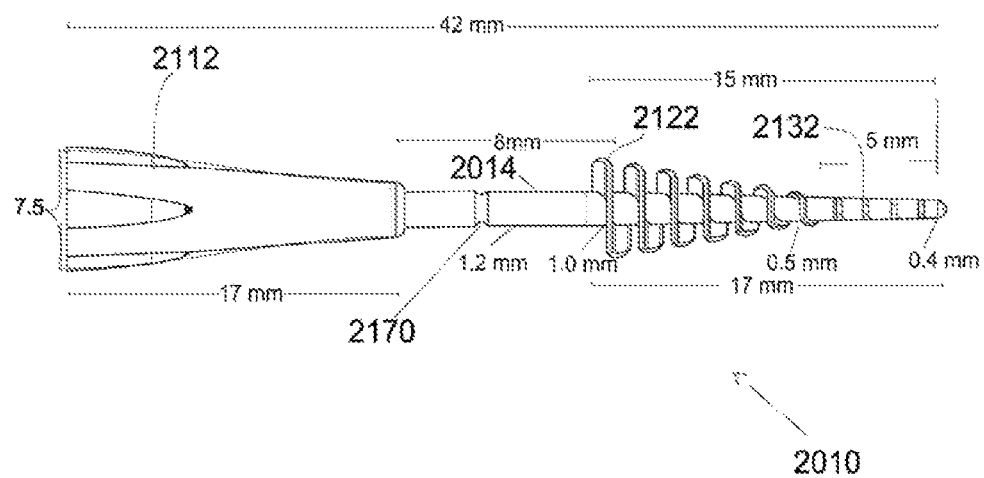
FIG. 27 is an elevation view of a dental device being a twenty-second embodiment of the present technology.

In FIG. 27, there is shown a dental device 2110 being a twenty-second embodiment of the present technology. The dental device 2110 has a handle 2112 and a stem 2114 extending therefrom. The stem 2114 has a tip 2116. The stem 2114 has a flange 2122 projecting outward therefrom and winding therearound. Flange 2122 is a right-handed winding.

The tip 2116 has a groove 2132 formed therein and winding therearound. The groove 2132 is continuous with the flange 2122. Groove 2132 is a right-handed winding.

In FIG. 27, some of the various dimensions of the device 2110 are shown.

Figure 28:
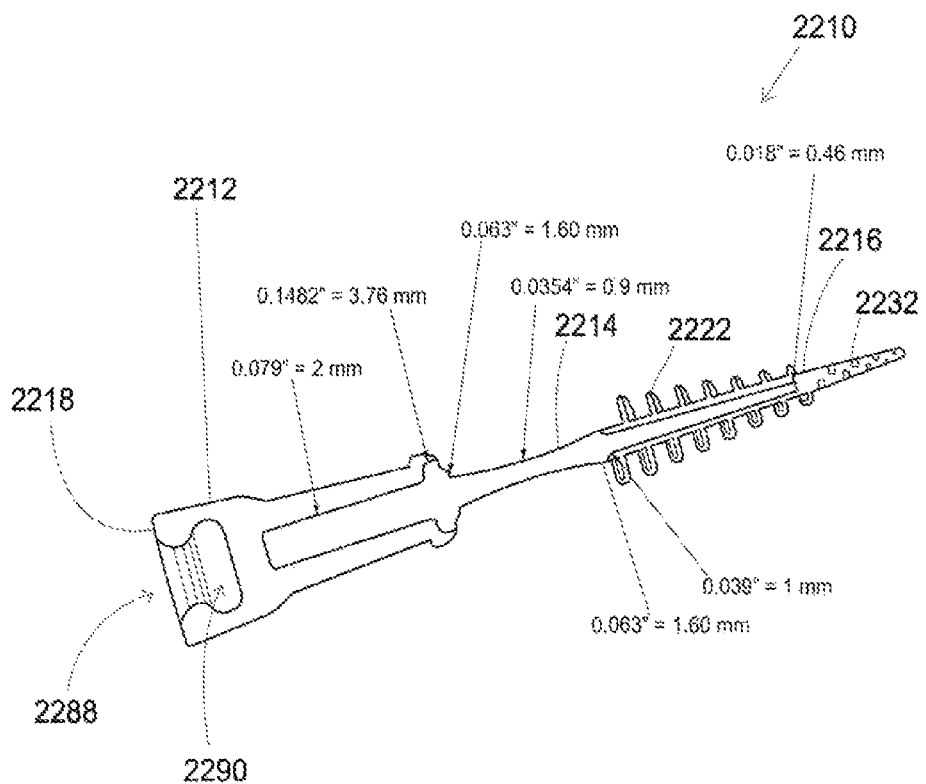
FIG. 28 is a cross-sectional view of a dental device being a twenty-third embodiment of the present technology.

In FIG. 28, there is shown a dental device 2210 being a twenty-third embodiment of the present technology. The dental device 2210 has a handle 2212 and a stem 2214 extending therefrom. The stem 2214 has a tip 2216. The stem 2214 has a flange 2222 projecting outward therefrom and winding therearound. Flange 2222 is a right-handed winding.

The tip 2216 has a groove 2232 formed therein and winding therearound. The groove 2232 is continuous with the flange 2222. Groove 2232 is a right-handed winding.

In FIG. 28, some of the various dimensions of the device 2210 are shown.

As can be seen in FIG. 28, within the end 2218 of the handle 2212 there is an opening 2288 into a cavity 2290. Cavity 2290 is sized and dimensioned to receive and securely releasably retain therein a standard dental instrument.

Figure 29:
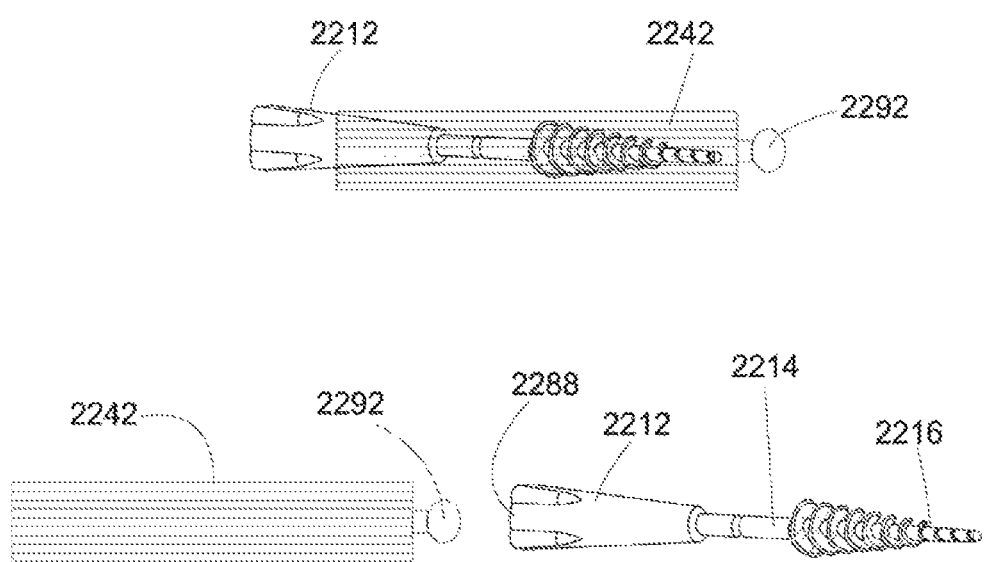
FIG. 29 is a schematic view of the dental device of FIG. 28 with a cover.

Referring to FIG. 29, in one embodiment, a cover 2242 can have a structure 2292 of similar size and dimensions to standard dental instrument. The structure 2292 can also be inserted into the cavity 2290 when the cover is not in use.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

The invention claimed is:

1. A dental device comprising
   a handle;
   a stem,
      the stem having a tip with an end, the tip having a first groove winding therearound extending from a first distal point proximate the end towards the handle at least one complete turn around the tip to a first-groove termination point,
      the stem having a first flange projecting radially outwardly therefrom and winding therearound, the first flange extending away from the handle from a first proximal point towards the end of the tip to a first-flange termination point, the first flange having a stepwise configuration formed by a series of planar step portions interconnected by a series of curved portions,
      at least a portion of the stem having the first groove and at least a portion of the first flange being suitable for insertion into an area between two teeth;
   whereby the area between the teeth may be cleaned by the at least a portion of the stem inserted between the teeth.

2. The dental device of clam 1, wherein the first-groove termination point and the first-flange termination point are axially offset from one another.

3. The dental device of claim 2, wherein the first-groove termination point is closer to the end of the tip than is the first flange termination point.

4. The dental device of claim 3, wherein the first-groove termination point is further from the end of the tip than is the first-flange termination point.

5. The dental device of claim 1, wherein the first groove is continuous with a valley formed between successive turns of the first flange.

6. The dental device of claim 1, wherein the first groove and the first flange are of an opposite handedness.

7. The dental device of claim 1, wherein the first groove has a series of linear portions interconnected by a series of curved portions.

8. The dental device of claim 7, wherein corresponding linear portions of each turn of the first groove are parallel.

9. The dental device of claim 8, wherein each turn of the first groove has four distinct linear portions.

10. The dental device of claim 1, wherein the first groove is discontinuous.

11. The dental device of claim 1, wherein the first flange is discontinuous.

12. The dental device of claim 1, further comprising at least one channel extending longitudinally along an exterior surface of the stem at least in part through discontinuities in at least one of the first flange and the first groove.

13. The dental device of claim 12, wherein the stem has at least one opening.

14. The dental device of claim 1, wherein at least a portion of the stem is at least one of coated and impregnated with a dentally-active material.

15. The dental device of claim 1, further comprising a plurality of bristles extending outwardly from radially around the stem towards the end of the tip.

16. The dental device of claim 15, wherein an even outer dentally-active edge is formed by the bristles.

17. The dental device of claim 15, wherein an outwardly sloping outer dentally-active edge is formed by the bristles.

18. The dental device of claim 15, wherein an inwardly sloping outer dentally-active edge is formed by the bristles.

19. The dental device of claim 1, further comprising a dome-shaped cup extending outwardly from radially around the stem towards the tip.

20. The dental device of claim 1, wherein corresponding planar step portions of each turn of the first flange are parallel.

21. The dental device of claim 20, wherein each turn of the first flange has four distinct planar step portions.

22. The dental device of claim 1, wherein the first flange is a right-handed winding.

23. The dental device of claim 1, wherein the first flange is a left-handed winding.

24. The dental device of claim 1, wherein the first-groove termination point and the first-flange termination point are a same point, whereby the first groove is continuous with the first flange.

25. The dental device of claim 1, wherein the first groove and the first flange are of a same handedness.

\* \* \* \* \*